US009021041B2

(12) United States Patent
Knighton et al.

(10) Patent No.: US 9,021,041 B2
(45) Date of Patent: Apr. 28, 2015

(54) SYSTEM TO PROVIDE INTEGRATED ON-LINE SUPPORT

(75) Inventors: Mark S. Knighton, Santa Monica, CA (US); Shane R. Arney, Santa Monica, CA (US); Peter J. DeLaurentis, Los Angeles, CA (US); Todd C. Moyer, Los Angeles, CA (US)

(73) Assignee: Nextpat Limited, Sheung Wan (HK)

( * ) Notice: Subject to any disclaimer, the term of this patent is extended or adjusted under 35 U.S.C. 154(b) by 2508 days.

(21) Appl. No.: 11/480,152

(22) Filed: Jun. 29, 2006

(65) Prior Publication Data

US 2008/0005240 A1    Jan. 3, 2008

(51) Int. Cl.
| G06F 15/16 | (2006.01) |
| G06Q 30/02 | (2012.01) |
| G06Q 10/10 | (2012.01) |
| H04L 12/18 | (2006.01) |

(52) U.S. Cl.
CPC .............. G06Q 30/02 (2013.01); G06Q 10/107 (2013.01); H04L 12/1822 (2013.01)

(58) Field of Classification Search
CPC ....... G06Q 30/02; H04L 12/581; H04L 51/04
USPC .................. 709/206, 207, 204, 203, 217, 219
See application file for complete search history.

(56) References Cited

U.S. PATENT DOCUMENTS

| 5,539,869 | A * | 7/1996 | Spoto et al. .................... 715/207 |
| 6,785,708 | B1 * | 8/2004 | Busey et al. .................. 709/204 |
| 7,356,345 | B2 * | 4/2008 | Cunningham et al. ........ 455/466 |
| 7,403,607 | B2 * | 7/2008 | Hession et al. .......... 379/265.12 |
| 7,451,188 | B2 * | 11/2008 | Cheung et al. ................. 709/206 |
| 7,680,888 | B1 * | 3/2010 | Marmaros et al. ........... 709/206 |
| 2001/0049688 | A1 * | 12/2001 | Fratkina et al. ............ 707/104.1 |
| 2002/0174010 | A1 * | 11/2002 | Rice, III .......................... 705/14 |
| 2003/0187672 | A1 * | 10/2003 | Gibson et al. ..................... 705/1 |
| 2004/0015548 | A1 * | 1/2004 | Lee ................................ 709/204 |
| 2004/0034723 | A1 * | 2/2004 | Giroti .............................. 710/8 |
| 2004/0128353 | A1 * | 7/2004 | Goodman et al. ............. 709/204 |
| 2004/0161080 | A1 * | 8/2004 | Digate et al. ............... 379/88.17 |
| 2004/0161090 | A1 * | 8/2004 | Digate et al. ............. 379/202.01 |
| 2004/0162881 | A1 * | 8/2004 | Digate et al. ................. 709/206 |
| 2005/0100159 | A1 * | 5/2005 | Fink et al. ................. 379/265.11 |
| 2005/0114758 | A1 * | 5/2005 | Lang et al. ..................... 715/512 |
| 2005/0114781 | A1 * | 5/2005 | Brownholtz et al. ......... 715/733 |
| 2005/0132298 | A1 * | 6/2005 | Lueckhoff et al. ............ 715/758 |
| 2006/0080130 | A1 * | 4/2006 | Choksi .............................. 705/1 |
| 2006/0090137 | A1 * | 4/2006 | Cheng et al. .................. 715/758 |
| 2007/0016643 | A1 * | 1/2007 | Boss et al. .................... 709/206 |
| 2007/0043822 | A1 * | 2/2007 | Brumfield ..................... 709/207 |
| 2007/0168444 | A1 * | 7/2007 | Chen et al. .................... 709/207 |
| 2007/0168446 | A1 * | 7/2007 | Keohane et al. .............. 709/207 |
| 2007/0168885 | A1 * | 7/2007 | Muller et al. ................. 715/853 |
| 2007/0206584 | A1 * | 9/2007 | Fulling et al. ................. 370/356 |
| 2008/0005269 | A1 * | 1/2008 | Knighton et al. ............. 709/217 |

* cited by examiner

*Primary Examiner* — Philip Crea
*Assistant Examiner* — Mohammed Ahmed
(74) *Attorney, Agent, or Firm* — Blakely Sokoloff Taylor & Zafman LLP

(57) ABSTRACT

An on-line support system providing a persistent chat system and a database of knowledge articles organized in a tree-based hierarchy. The on-line support system merges the utility of a communication system with a knowledge navigation system. Knowledge can be accumulated through text, voice and image communications by a user in a common environment, and these communications are preserved and organized for future reference.

17 Claims, 15 Drawing Sheets

SYSTEM TO PROVIDE INTEGRATED ON-LINE SUPPORT

BACKGROUND

1. Field

Embodiments of the invention relate to a system and method for providing support and on-line communication. Specifically, embodiments of the invention relate to tools that may be used with an on-line support system with persistent chat and automatic media integration features.

2. Background

Companies which deliver products to end users, especially, complex or technical products, typically also provide support to the end users to assist the end users with their products. Traditional support has been through on-location sales or technical personnel, traditional correspondence and telephone correspondence.

Increasingly, companies are turning to on-line support as a tool for assisting their customers. On-line support is typically provided through email, chat rooms or forums. Each of these tools has limitations in providing quick and effect support to end users.

Some companies provide an email address through which end users can contact technical or sales personnel. End users send questions by email to a company support email address. A company technician or salesperson then replies to the end user emails. However, an end user does not know when an email has been received or viewed and may become frustrated if a quick response is not forthcoming. End users may not provide sufficient information to the company in their email to answer the support questions that are asked. Multiple exchanges of email may be necessary. This process can take hours, days or even weeks. Also, the same company technician may not be available to answer each email received from an end user. As a result, the end user may be frustrated with inconsistent answers and the length of time involved in obtaining a resolution to his problem.

Some companies provide a chat room to allow users to more quickly interact with support personnel. The chat room may be provided through a company website. An end user can more quickly interact with support personnel, but still may have difficulty in providing sufficient information to the support personnel to properly diagnose and resolve a problem. In addition, the user does not have a permanent record to refer to if the problem occurs again. The instructions and advice provided by the support personnel in the chat room are lost as a chat session is closed or if the chat session exceeds a limit of a content window or log length. Also, if a user leaves a session then the dialogue from the session is lost.

Some companies provide forums for user support. Forums help support personnel to avoid having to repetitively answer the same questions for multiple end users, because they provide a permanent record of the questions and answers processed by the support personnel. Forums allow a user to post questions on a web page and to search through previous discussion threads to find answers to his questions. However, an end user who does not find an answer in the forum must wait for a support personnel response and, like email, this process may takes hours, days or even weeks. Navigating forums can also be confusing and the process of posting a message to a forum can be complicated and slow.

As a result of the limitations of online support tools, companies must maintain the traditional support tools and many provide several separate and redundant on-line support tools to meet the needs of end users of their products.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1A:
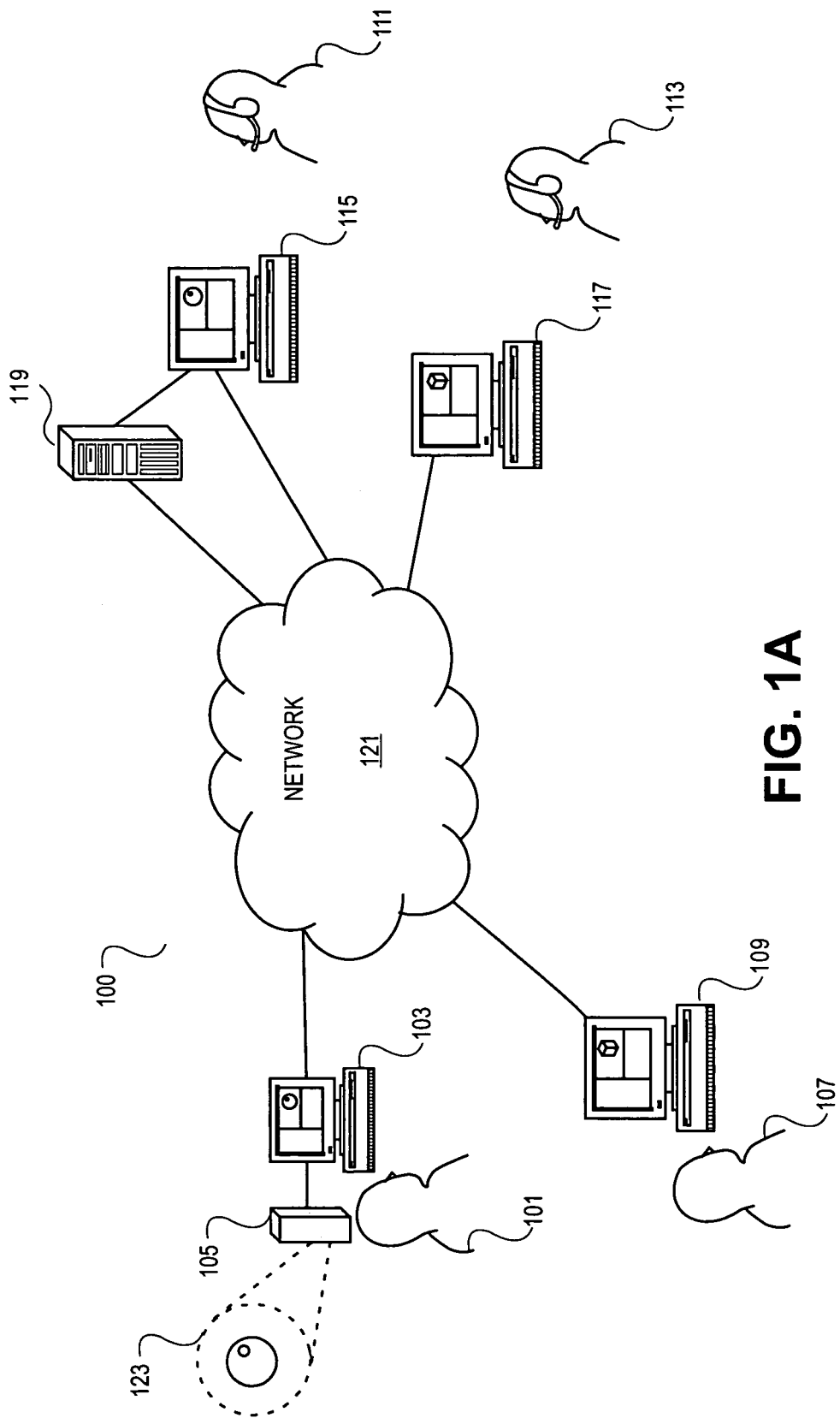
FIG. 1A is a diagram of one embodiment of an on-line support system.

FIG. 1 is a diagram of one embodiment of an on-line support system. The support system 100 may include a set of networked computers and individuals. As used herein a set may refer to any number of items including one. An end user 101 may access the on-line support system 100 through a personal computer 103. An end user 101 may also utilize a workstation, console device, handheld device, laptop computer or similar system. An end user 101 may seek assistance with a product 105 attached to their computer. In other embodiments, the end user may be seeking support for software on the computer 103. In further embodiments, the end user 101 may be seeking assistance for products independent from the computer or its software. Other end users 107 may be seeking support for similar products that maybe connected to their computers 109 or independent from their computers 109.

End users 101, 107 may be in communication with support personnel 111, 113 over a network 121. The support personnel 111, 113 may be utilizing personal computers 115, 117, workstations, servers, handheld devices, console devices, laptops or similar devices. The support personnel computers 115, 117 may be directly connected to the network 121 or indirectly connected to the network 121. The network 121 may be a local area network (LAN), wide area network (WAN), the Internet or similar distributed networks. The support personnel 111, 113 may be remote or local to the end users 101, 107. For example, the end users 101, 107 and support personnel 111, 113 may work for the same company in the same building or campus. In another example, the end users 101, 107 may be consumers at home or work and the support personnel 111, 113 may be at a support center or corporate office.

In one embodiment, the end user and support personnel computers may be locally or remotely connected with a server 119. The server 119 may provide the on-line support system through which the end users 101, 107 communicate with the support personnel 111, 113. The server 119 may host a web application server, a database server or similar applications and provide similar services in support of the on-line support system 100. The server 119 may store or archive the content provided over the on-line support system 100. In another example embodiment, there may be multiple servers connected together to handle large volumes of users and content.

In one embodiment, the end user 101 may be utilizing a product such as an imaging device 105, camera, a three dimensional imager or similar device. The imaging device 105 or similar product may be locally connected with the end user computer 103 by a direct connection or wirelessly. The imaging device 105 or similar product may also be located remotely from the end user computer 103 and accessible over a distributed network. The imaging device 105 may provide a constant image or video input or may capture individual images. This input may be captured and imported into the on-line support system 100. An object 123 may be scanned or imaged and captured as a two or three dimensional representation. In other embodiments, a user may not have peripheral input devices to capture local image data. Other application data may be shared with the on-line system. The other data may include application data, modeling data, image data and similar data generated by the end user 103, 107 or applications local to the end user. In one embodiment, the end user 103, 107 may utilize a specialized application for accessing the on-line support system 100. In one embodiment, the end user 103, 107 may use a general purpose application such as a web browser for accessing the on-line support system 100. In another embodiment, the end user 103, 107 may access the on-line support system through a tool offered in another application. For example, the tool may be offered through image capture software associated with an attached peripheral camera. In a further embodiment, the end user 103, 107 may access the on-line support system 100 through a standard web browser or other generic application. In another embodiment, the end user 103, 107 may interact with the online support system through a user interface built into a commercial application which primary purpose is not support. For example, a software application for editing three-dimensional models may have a button which shows a user interface for the support system, and automatically provides information about the context of the application with the intent of making the support provided more helpful to the user.

In one embodiment, support personnel 111, 113 may utilize specialized applications to interact with the end users 101, 107. In another embodiment, the support personnel 111, 113 may use tools that are part of an application. In a further embodiment, the support personnel 111, 113 may use a general purpose application such as a web browser to interact with the end user 101, 107.

As discussed further herein below, the on-line support system 100 provides a communications interface between end users and support personnel 111, 113. Also, end users 103, 107 may communicate and assist one another. Data may be shared between some or all users of the system. Data shared may include text, voice, image and similar data. Image data generically is deemed to include without limitation video clips, screen shots, still images, and three-dimensional models. For example, in one embodiment, dedicated support personnel may not be present. A community of end users may provide support to one another. Some community members may have moderator or administrator type privileges to ensure the quality and order of the on-line system. This may be part of a community editing system or set of policies. In one embodiment, the online support system may provide communication and information services to all users of the system. Users may share data including text data, image data, systems data, applications data, voice data and similar data. Similarly, the system may support voice, video and fax communication between users. In one embodiment, the image data is shared at a resolution native to the imaging device, allowing remote users to resolve small details in the image.

Figure 1B:
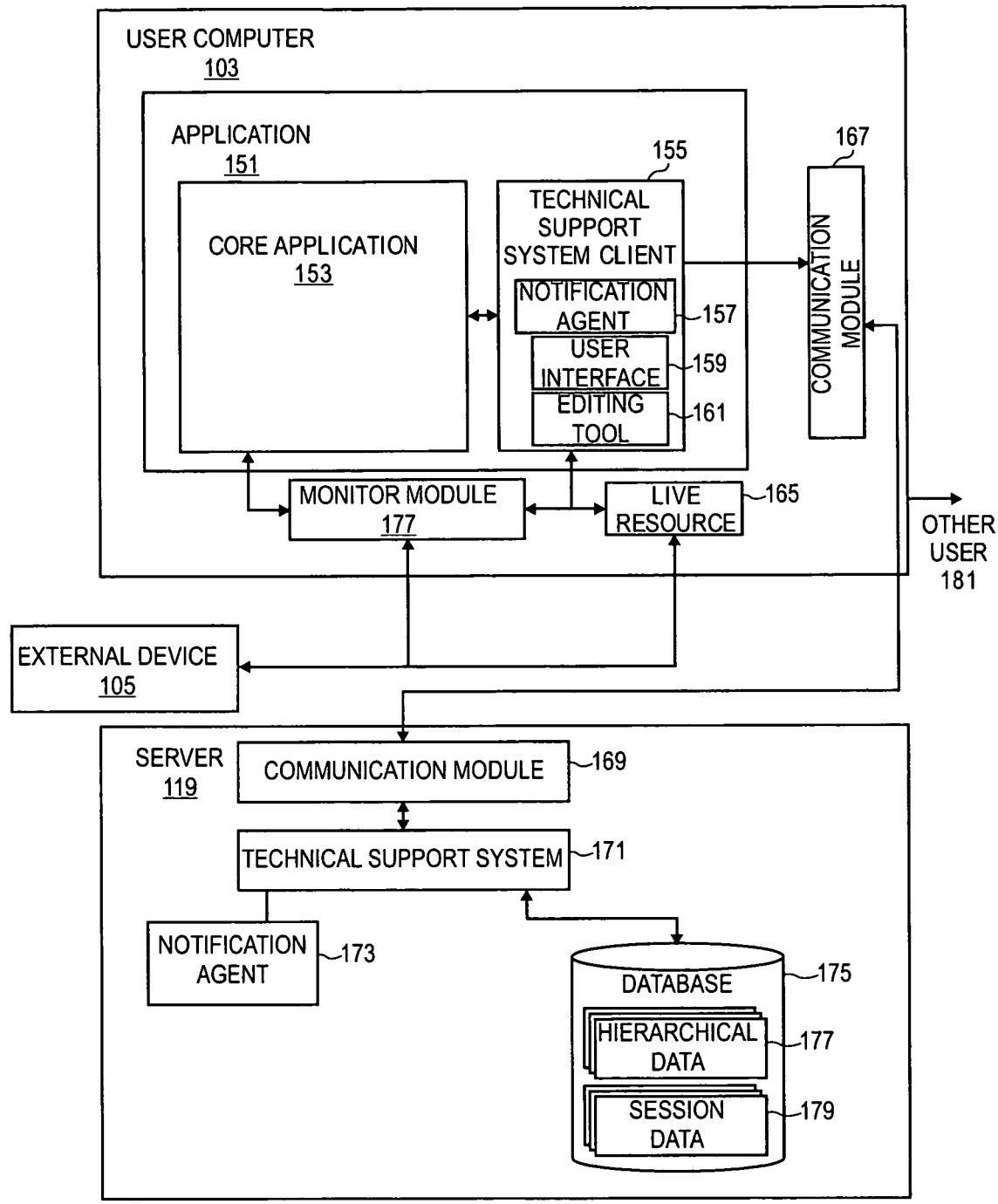
FIG. 1B is a diagram of one example embodiment of the components of an on-line support system.

FIG. 1B is a diagram of one embodiment of the components of the on-line support system. The on-line system may be present on the user computer 103 in the form of a technical support system client 155. The technical supports system client 155 may be a part of an application 151. In another embodiment, the technical support system client 155 may be a stand-alone application. The application 151 may be any type of application, including a computer aided design (CAD) application, an image or model capture application or similar program. The application may include a core application 153 component that performs the primary task of the application. The core application 153 may operate in conjunction with the technical support system client 155 providing it with status and other information. Information provided by the core application 153 may be utilized by the technical support system client 155 and on-line support system to locate relevant information.

The technical support system 155 may include a user interface 159 component, notification agent 157, editing tool 165 and similar components. The user interface component 159 provides the user interface through which the user interacts with the on-line system. The notification agent 157 may generate messages, such as electronic mail messages, system messages, instant messages, pager notification or similar messages accessible by the user when the application is not active notifying users of changes and updates in the on-line system. When the application is active, notification agent 157 may provide change notification as a chime, popup, or similar indicator, in addition to or instead of the other notification types discussed above. Similarly, the notification agent 157 may receive messages from other users, the server or other sources. The notification agent 157 may then generate an indicator of an event to a user. For example, if a user is engaged in a chat session the notification agent may generate a session event to notify the user of a message or other occurrence external to the chat session. The editing tool 161 may provide word processing and similar tools for editing articles as described herein below, as well as adding and embedding media into the articles.

A communication module 167 provides communication for the application 151 and the technical support system client 155 allowing the exchange of data with other applications, computers, servers and similar entities. The communication module 167 may provide connectivity with the on-line support system including a server 119 or other user computers.

In one embodiment, external devices 105 may be detected and managed by a monitor module 177. The monitor module 177 may be an independent program, a plug-in, a component of the technical support system client 155 or similar application. The monitor module 177 may detect the presence of external devices 105 that are directly connected to the computer 103, connected through a local network, connected through a wide area network or similarly connected to the computer. The monitor module 177 may alert the technical support system client 155 of the presence of the external device 105 or data available from the external device 105. In another embodiment, devices handled by the monitor module 177 may include devices housed within the computer.

In one embodiment, the data produced by the external device may be used to create a live resource 165. The live resource 165 may be generated by the monitor module 177 or similar program. The live resource 165 may be a program, data structure or similar resource that is accessible by other applications to provide access to data from the external device 105. For example, the external device 105 may be a camera. The live resource 165 may be a recent image captured by the camera or the live viewfinder information from the camera. Any number of live resources 165 may be generated and made available from any number of connected external devices.

In one embodiment, a user computer 103 may be in communication with a server 119 or other user computers 181. Other user computers 181 may be organized in the same manner and include similar components to those present in the illustrated user computer 103. The server 119 may perform storage operations and facilitate communication between users. In one embodiment, the server 119 may communicate with any number of user computers through a communication component 169.

The on-line support system related functionality of the server 119 may be provided by a technical support system 171 application. The technical support system 171 application may provide services to the user including data retrieval, message forwarding, notification generation and similar services.

In one embodiment, the technical support system 171 is in communication with a notification agent 173. This notification agent 173 may work in conjunction with the notification agent 157 of the technical support system client or may work in place of such an agent. The notification agent 173 generates electronic mail messages, system messages, instant messages, pager notification or similar messages to notify users of changes in the on-line system such as updates of articles. In one embodiment, notifier 173 generates notifications that are globally available to a user independent of whether the application in which the change occurred is currently active.

In one embodiment, the server 119 may provide a persistent storage system 175. The persistent storage system 175 may be a database such as a relational database, object oriented database or similar system 175. The persistent storage system 175 may include hierarchy data 177 and session data 179. Hierarchy data 177 may include information related to the structure of the data stored and provided by the on-line system. The hierarchy data 177 may be used to maintain and encode the relationships between subject matter or knowledge articles and chat sessions. The session data 179 may include data from chats and similar data. The session data 179 may be a persistent record of the sessions within the hierarchy. The session data 179 may include logs of chat messages and annotations made during chat sessions and similar information. In one embodiment, the session data 179 also may include images and video clips or links to images and video clips and similar types of content.

Figure 2:
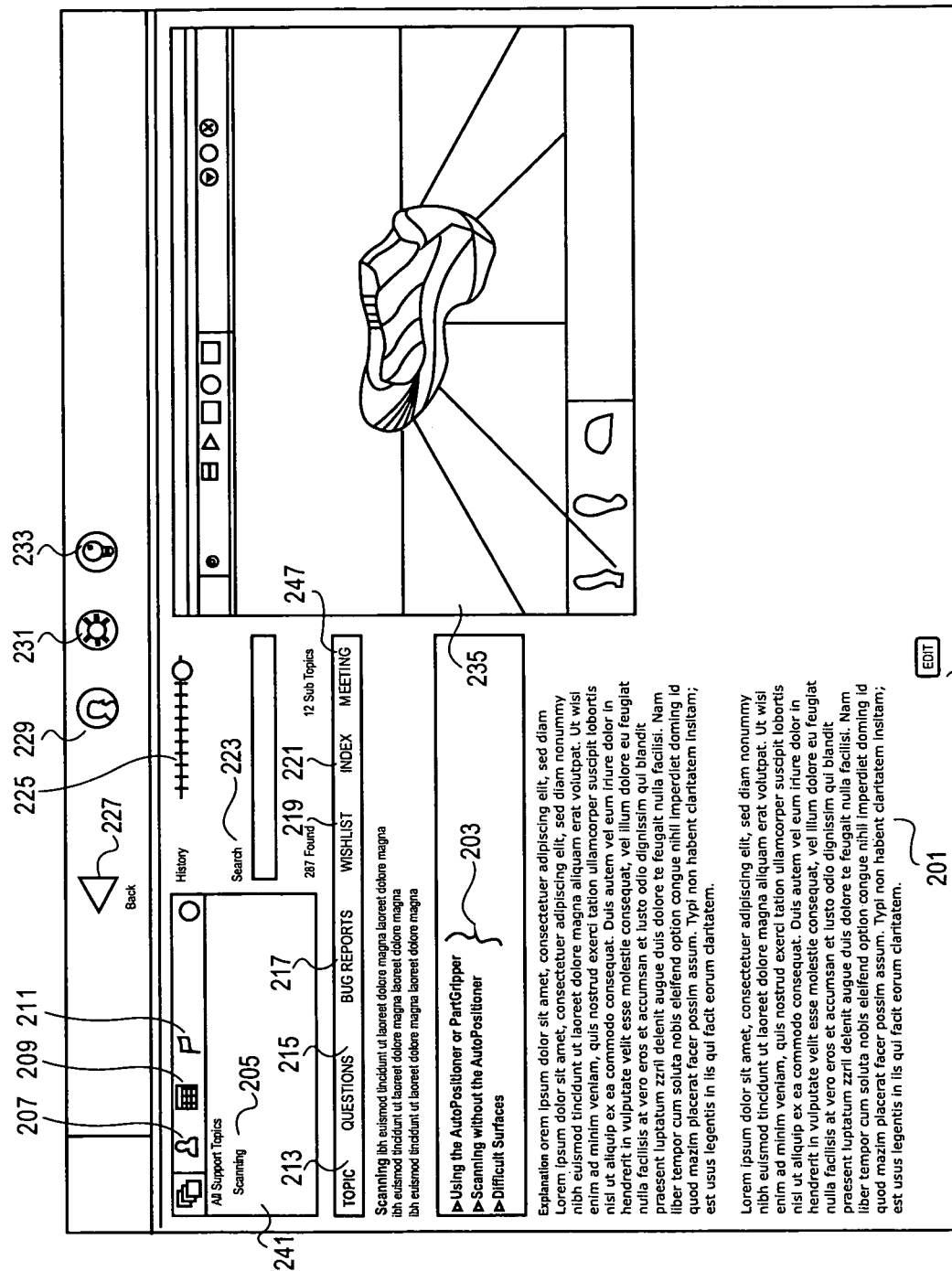
FIG. 2 is a diagram of one embodiment of a user interface for the on-line support system.

FIG. 2 is a diagram of one embodiment of a user interface for the on-line support system. The user interface 200 may be provided by a specialized application, as a tool or feature of an application dedicated to other work or by a general purpose application, such as a web browser accessing a site provided by the on-line system. In one example, the user interface 200 may be a part of a software program for an imaging system.

In one embodiment, the user interface 200 includes a content window 201. The content window 201 provides the user information based on a currently selected topic 213, question and answer 215, bug report 217, wish list item 219, meeting 247 or similar item. The content window 201 may display a knowledge article, chat, log or similar information; these are generically referred to herein as "articles." The knowledge article may be a prepared piece of text providing information on a specific topic. The knowledge article may be entirely text or may incorporate links to other media or may include other media. The knowledge article may be of any length and may be associated with a specific topic or may describe a general topic. In one embodiment, within the hierarchy, a knowledge article may own one or more chat sessions that are organized under the knowledge article in the hierarchy. The collection of knowledge articles may form a knowledge repository that is stored and maintained by the on-line system.

All types of articles may be found and accessed through navigation of a hierarchy of topics or the knowledge repository, through a search or similar method. The search may return an article based on an associated keyword, question, bug or similar category of information. The article may be associated with a specific place or set of places in the hierarchy of topics. The article may be freely modified by a user or may be static.

A chat is a type of article that may be a record of an interaction between two or more users or even a monologue by a single user. An instance of a chat may be referred to as a chat session. A session may be composed of a sequential series of communications between participants. The user interface may provide a prompt, cursor or similar indicator, at the currently editable position in the sequential series to allow text entry so that a new message or communication may be composed while previous message data or communications can be viewed. A participant may be a user, support personnel or a robot. A chat session may also include links to other media, articles, such as knowledge articles or chats. A chat session may also include media displayed inline or simultaneously in another window or section of the interface. A chat may be associated with a specific topic such as a keyword, a question, a bug or similar category of information. A chat may be associated with a specific place or set of places in a hierarchy or topics, a compendium of chats or similar structure. In one embodiment, the support system prompts a user to place the chat session within the hierarchy when they initiate the session. In one embodiment, the support system allows the user to move their chat session to a new place within the hierarchy at any time. In one embodiment, the system will initially infer from context a likely location for the chat session within the hierarchy and request confirmation from the user. The chats and knowledge articles maintained by the on-line system, combined, may form a compendium.

A chat session may be entered into by any user, depending on an associated set of permissions, and modified at any time. In another embodiment, a chat session may be locked to certain users or by a moderator or creator of the chat. The chat may operate in full duplex such that each participant can see the messages of other users as they are typed or as they are committed. In one embodiment, private messages between chat session users or 'whispers' may be supported. Private messages may be supported between users of separate chat sessions or any user of the on-line support system.

Knowledge articles, chats and other types of articles may be organized into a hierarchy of topics. These articles may be further categorized into questions & answers (Q&A), bug reports or listings, wish list items, meetings or similar categories. Instance of all types of articles may be referred to as sessions. The articles may have titles and metadata associated with each instance. The titles and metadata as well as the content of the articles themselves may be used for purposes of filtering, sorting or searching the hierarchy to allow a user to identify an article particular relevance. The hierarchy may be a tree structure or nested tree structure with articles grouped by topic. In other embodiments, articles may be ordered into other types of structures including simple lists, interconnected networks and similar organizations. In one embodiment, hierarchy information, topics and articles may also be indexed 221.

Any amount of text may be part of an article. If more text is part of the article than can be displayed then the content window 201 creates a scroll bar or similar tool to allow the user to browse the entire article. The content window 201 may be any size, shape or placement in the interface. In one embodiment, the contents of an article may be sorted, realigned or filtered. For example, a chat may be viewed in the normal sequence or may be sorted to view only one participant's messages or the chat sequence during a specified time period.

An article may contain links to other articles including knowledge articles and chats as subtopics or more general topics. These subtopics and general topics may be specially marked or highlighted to distinguish them from normal text. These links may be to other articles that are part of a hierarchy of data maintained by the on-line system. These links may also be to external data such as external web pages or documents. Clicking or similarly selecting these links may navigate the user to that content, which may be displayed in the content window 201. External documents may be displayed in ancillary windows or sections of the interface (not shown).

The articles may also include links to other types of data that are hosted by the on-line service. Other types of data may include images, models, system information, logs and similar data. These items may be embedded into articles, including knowledge articles and chats as described further herein below. These embedded items may be viewed in a viewer window 235. For example, a recent screen shot may be displayed in the viewer window 235. The media may be represented in the article as a thumbnail, icon, low or reduced resolution image or full resolution image. The representation may be selected by the user to view the media in a larger format or other representation. In one embodiment, the media may also be annotated. This annotation may be displayed along with the image or upon mouse-over or similar examination of the media.

The user interface 200 may also include a set of navigation tools. These navigation tools may include navigation bars. A navigation bar may include buttons or links to the different types of content provided by the on-line support system. A navigation bar may include a topic button 213. The topic button may take a user to a topic at a specific level in the hierarchy of data. This level in the hierarchy may be determined based on settings in other navigation tools. For example, a tree based representation of the hierarchy 205 may be used to indicate the level or node in the hierarchy that the user desires to view. Other types of filters may be used in conjunction with or in place of the tree hierarchy 205, individually or in any combination. Other types of filters may include filtering articles based on a user that contributed to the article 207, a date range or time 209, by state information 211, for users, articles, systems, or similar types of filters. In one embodiment, the tree-based representation of the data 205 may be displayed in a filter window 241. This filtering may also prune an index 221.

Other navigation tools may also be used to find the information desired by a user. A search tool 223 may be used to find information by keyword, topic title or similar search of the on-line support system. Results of a search may be displayed in the content window 201 by article title, hierarchy label or similar label or grouping. If a large number or results are generated then the search may be further refined. The search may support Boolean operators and similar functionality.

A history bar 225 may be adjusted by a user to take the user back along a path of navigation. The user may also use the history bar 225 to return to the current position after viewing a specific article in the history. In one embodiment, each point in the navigation may be marked by a detent on a sliding bar. In another embodiment, other interface options may be provided for viewing the history of navigation in list form or similar format. Recently accessed articles may also be tracked as well as favorite or frequently accessed articles may be similarly accessed through the user interface.

Each of these navigation tools may be used to select, filter or sort the topics that a user may view, thereby allowing the user to easily identify those topics of greatest relevance. These navigation tools also may be applied to the categories of Q&A 215, bug reports or listings 217, wish list items 219, meetings 247 and similar categories of topics and articles. Additional information regarding items returned by filtering or searching may be viewed by a mouse-over of the entries that may reveal the author, time of creation and similar information.

Additional navigation tools may also be present to take a user to predetermined locations in the hierarchy. These navigation tools may include a back button 227, an 'ask' button 229, a bug button 231, an idea button 233 and similar types of buttons. A back button 227 may allow a user to navigate backwards to the last article or topic that was accessed. This button 227 may be used repeatedly to navigate backward in a manner similar to the use of the history slider 225.

The ask button 229 may be used to take a user to a specific level in the questions category 215. For example, the ask button 229 may take the user to a top level of a hierarchy in the questions category. The user may open a new question chat or other type of article at this level or navigate through the question category. In another embodiment, the ask button 229 may take a user to a level in the hierarchy inferred from contextual information or similar information. In an example embodiment, use of the ask button 229 automatically creates a new article, such as a chat session. The user may then be prompted to place the new article in the hierarchy.

The bug button 231 may be used to take a user to a specific level in the bug listing category 217. For example, the bug button 231 may take the user to a top level of a hierarchy in the bug listings category. The user may open a new bug listing chat or other type of article at this level or navigate through the bug listing category. In another embodiment, the bug button 231 may take a user to a level in the hierarchy inferred from contextual information or similar information. In one embodiment, the system automatically captures a screen shot of the user's system responsive to actuation of the bug button. In a further embodiment, a parameter log is also captured responsive to the actuation of the bug button. In an example embodiment, use of the bug button 231 automatically creates a new article, such as a chat session. The user may then be prompted to place the new article in the hierarchy.

The idea button 233 may be used to take a user to a specific level in the wish list category 219. For example, the idea button 231 may take the user to a top level of a hierarchy in the wish list category. The user may open a new wish list chat or other type of article at this level or navigate through the wish list category. In another embodiment, the idea button 233 may take a user to a level in the hierarchy inferred from contextual information or similar information. In an example embodiment, use of the idea button 233 automatically creates a new article, such as a chat session. The user may then be prompted to place the new article in the hierarchy.

A user may use an edit button 237 or similar button to edit articles, such as knowledge articles or enter a chat in the hierarchy. The editing process may provide a user random access to the text content of the article. In one embodiment, the user editing power may be restricted based on a set of permissions individual to each user. For example, support personnel and other company personnel may be allowed to edit articles without restriction. Other users may only be allowed to edit articles or chat entries they authored or may require approval before their edited documents are published to other users of the on-line support system. Some users may be prevented from making any edits to the on-line support system.

Figure 3A:
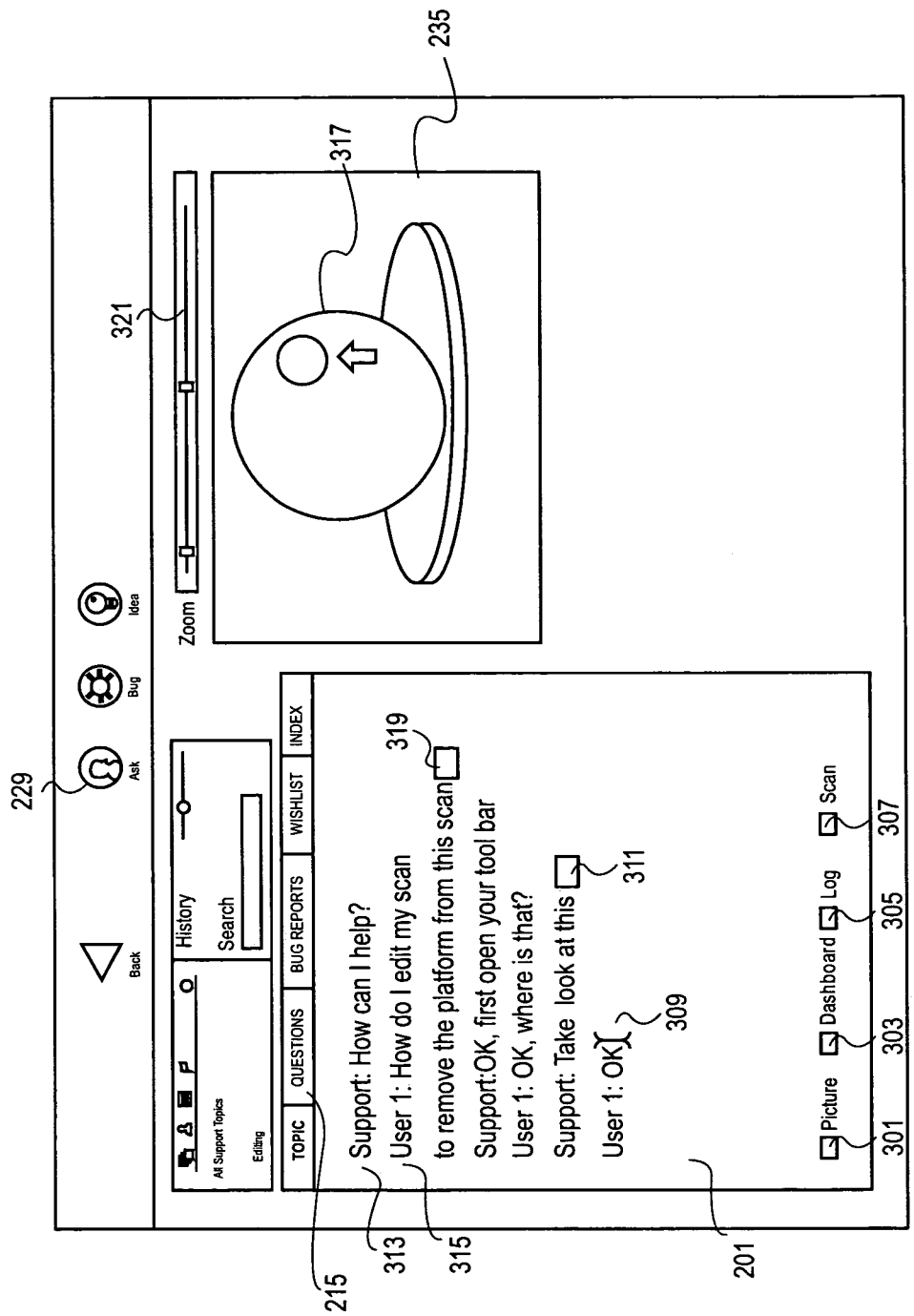
FIG. 3A is a diagram of one embodiment of a user interface for an on-line support system where a user has created a question and answer (Q&A) chat.

FIG. 3A is a diagram of one example embodiment of a user interface for an on-line support system where a user has created a Q&A chat. A user may create a Q&A chat or other type of article by selecting the Q&A button 215, the ask button 229 or similar navigation tools and then selecting an existing article session, such as a chat session or creating a new question. Creating a new question makes the content window 201 interactive providing a prompt 309 and allowing a user to type directly into the window 201 at the prompt.

Multiple users may participate in the chat. Each user may be identified by a login or username 313, 315. Entries may be displayed after each carriage return or may be displayed with each keystroke. At any point a user may insert pictures 301, a dashboard 303, a log 305, a scan 307 or similar data at the action location such as a cursor, cursor point, a user selected area or similar indicator. The user may select appropriate boxes 301, 303, 305, or 307 to add a link and upload the appropriate data. The appropriate data may be automatically determined from context. For example, if a scan 307 is selected to be added then the last scan saved may be used or a new scan may be started. The appropriate data is then uploaded to the on-line support system server. The data may then be displayed in a viewing window 235. A link 319, icon, thumbnail or similar indicator may also be embedded into dialogue at the action location, such as a cursor position, when the selection is made. In some embodiments, the data itself may be inserted into the action location. This link may be used by other chat participants or article viewers to access the data and view the data in the viewing window 235.

Each participant may make as many entries in the chat session as desired. Each entry in the chat session appears to each of the users in the chat seminar automatically after entry or during the process of entry. A user may view entries at the same time that he creates a new entry.

In one embodiment, the log of the chat is persistent; any and all participants may leave the chat and come back to it at any time. The log of the chat may be stored by the on-line support system at a remote or local server. Each user may link or embed other data such as scans 319 and pictures 311. Each type of media or item of media embedded in a chat may have a different symbol or icon representation in the chat. The linked data may be stored by the on-line support system or may be stored by an external system, such as a remote server. Insertion of data, such as image data (or a link thereto), into text based documents has particular value in the context of a support system. Easy and automatic insertion of images (or representations thereof) particularly are of significant value in other content creation contexts. For example, for a user to be able to insert an image into a word document, e-mail, spreadsheet, etc., without navigating to and selecting or dragging and dropping is likely to significantly facilitate the exchange and use of images in text based documents generally.

The viewing window may also provide interactive functionality. The viewing window 235 may allow a user to zoom into a selected area of an image, scan or other data. A user may click on the area to be zoomed, automatically and smoothly zooming into that area of the data. This zooming to a point avoids the need to reposition the image after zoom to get to an area of interest. The degree and number or zoom settings may be modified. A zoom settings bar 321 may be used to adjust the settings. The zoom settings may be limited or set based on the type of image being displayed or the characteristics of the image. The viewing window 236 may also provide an easy way to zoom out with a second click, making it easy for the user to toggle between detailed viewing and an overview. Similarly, models or multidimensional representations may be zoomed, rotated, turned and similarly manipulated. Video may be played, paused, zoomed and similarly manipulated. Animations, such as Flash animations and similar animations may also be accessed, viewed and played. In one embodiment, images or models maybe be multi-resolution models (MRM) allowing different levels of resolution to be shown at different zoom levels. The use of MRM also allows for progressive displays of the models during transmission at the destination.

Figure 3B:
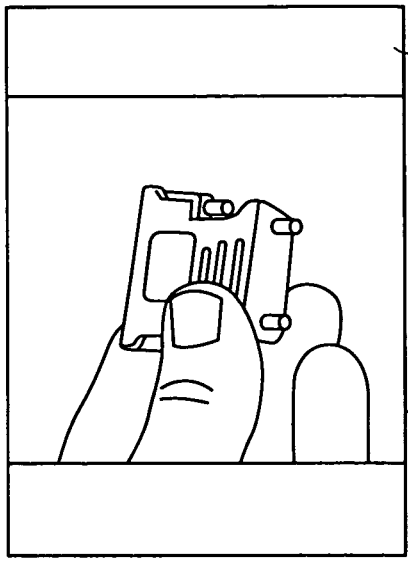
FIG. 3B is a diagram of one embodiment of a user interface for an on-line support system where a user has posted images in a chat session.

FIG. 3B is a diagram of one embodiment of a user interface for an on-line support system where the user has posted images during a chat session. The end users may engage in a chat session based conversation using the on-line support system through a Q&A article or other type of article associated with a bug list report, a wish list item, a meeting or similar category of article. The participants may both embed images, scans, dashboards, logs and other items in the article. For example, a user may embed 351 an image 353 in a chat session. Both users may view the image 353 through the viewing window 235. Each user may insert text directly into the content window 201 that is displaying the chat session at any time. A prompt or similar indicator may designate a text entry position. In another embodiment, a user may select any location in the content window 201, viewing window 235 or similar location for entering text as part of the chat session;

this may include adding text to other media, for example annotating an image. The chat session is permanent and may be returned to after exiting by any participant. New participants may enter the chat session at any time as well.

Figure 4:
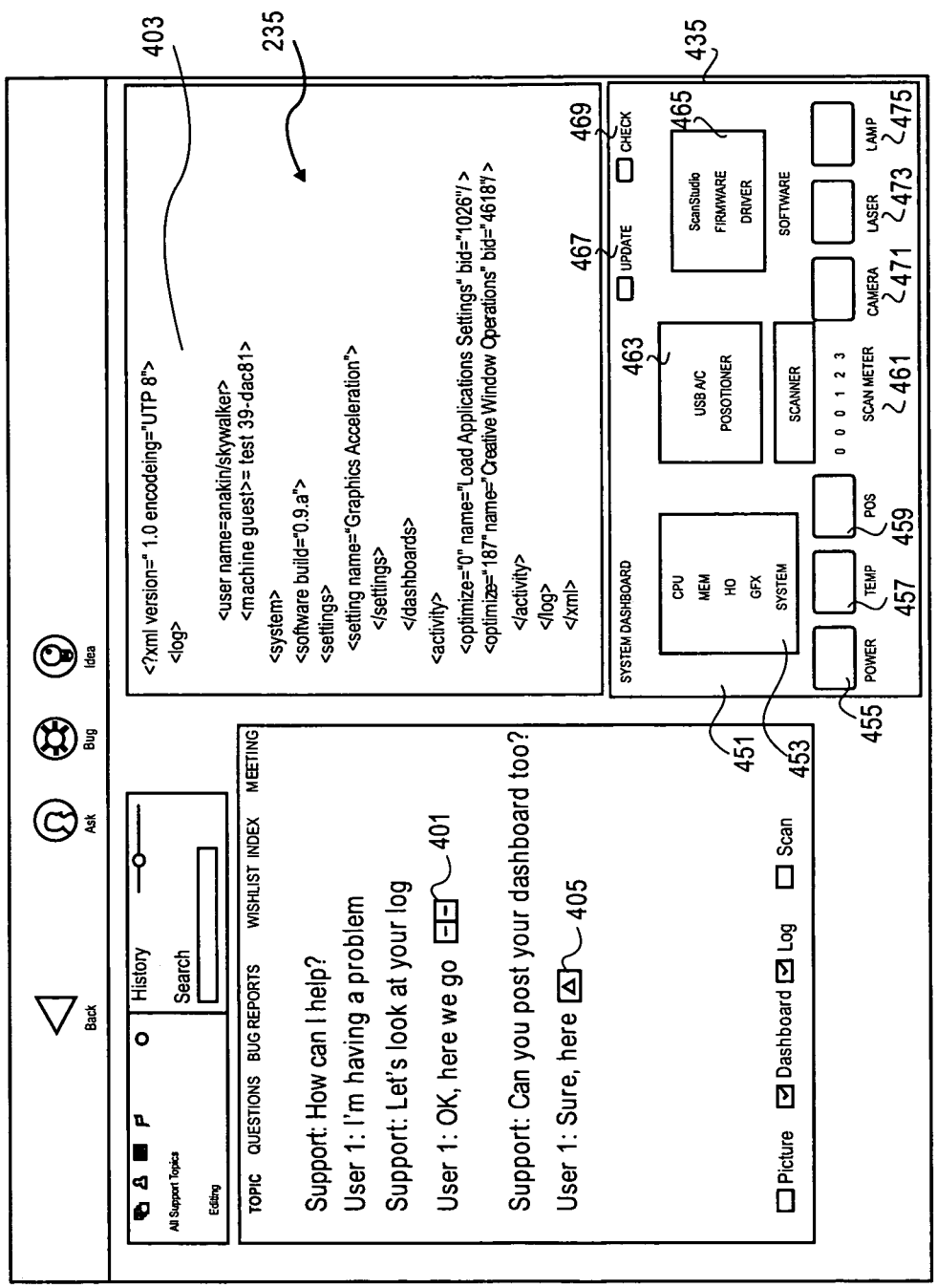
FIG. 4 is a diagram of one embodiment of a user interface for an on-line support system where a log and dashboard are displayed.

FIG. 4 is a diagram of one example embodiment of a user interface for an on-line support system where a log and dashboard are used. A user in a chat, such as a Q&A chat in the content window 201 may also upload and embed log files 401 and dashboard files 405. A log file 403 may be displayed in the viewing window 235. A second viewing window 435 may be displayed simultaneously to allow the viewing of more than one item at a time. For example, first viewing window 235 may display a log 403 at the same time that a second viewing window 435 displays a dashboard 451.

A log 403 may be a file with a history of activity for a program, device or similar item. The log 403 may be in plain English, encoded, object oriented or similarly stored. For example, the log 403 may be an extensible markup language (XML) document. The log 403 may contain any type of information about any process or occurrence. The log 403 may provide information related to a user question or information needed to recreate or understand a problem. The log 403 may include data covering a sequence of data, state data and similar data. The log 403 may have any length or cover any duration of time. A log may be used to navigate, automatically or manually, through the hierarchy by using a stored log entry as a filter or basis for sorting. This process may be facilitated by making key words or entries in the log clickable to automatically filter the hierarchy to find articles related to the clicked log entry.

A dashboard 451 may be a graphical or textual representation of information. The information may be related to the computer system and software on a user computer. The information may also include status and configuration information about peripheral devices. In another embodiment, the information may be related to a product or service independent from the computer system. For example, a dashboard 451 may include power 455, temperature 457 and positioner (POS) 459 state information for a system of a user or a device in communication with the user computer. A dashboard may show system information such as processor (CPU) type, memory type and amount, storage device type and configuration, graphics system characteristics 453 and similar system information. Data regarding an attached peripheral device or other device in communication with the computer may be presented including connection type, status and characteristics 463, and device settings, drivers, configuration, operating status, metering 561 and similar information. System software information may include driver information 465, operating system information, application information and similar data. The data may include software information for peripherals and subcomponents such as a camera 471, laser 423, lamp 475 and similar components and peripherals.

The dashboard 451 may also include interactive features and tools. The dashboard may provide buttons, check boxes and similar interface tools to prompt the update 467 of dashboard information, testing or other checks 469 and similar tools. These features and tools may be available only to the creator or local user of the dashboard 451. In another embodiment, these features and tools may be accessible to all of the users viewing the dashboard 451.

Figure 5A:
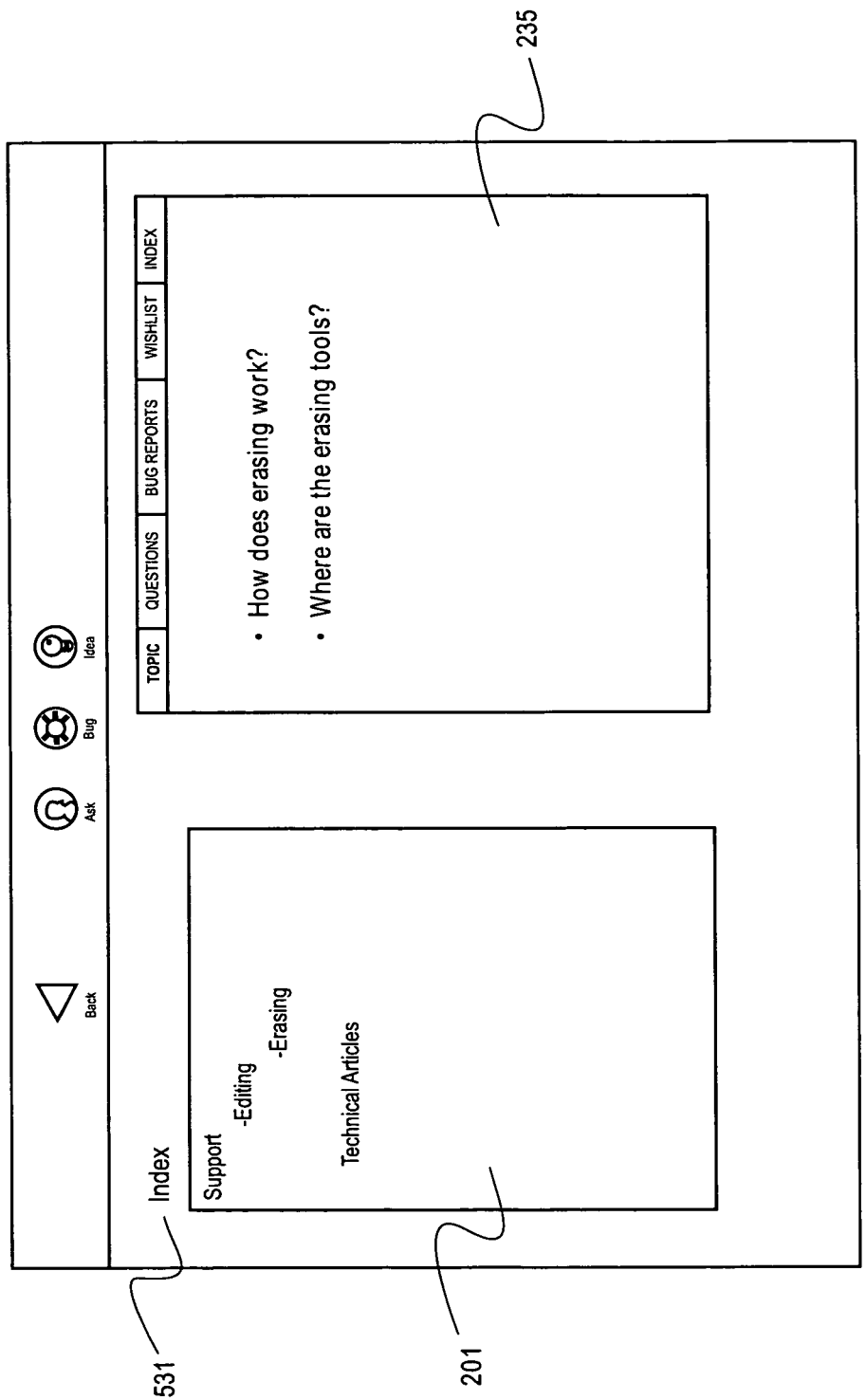
FIG. 5A is a diagram of one embodiment of a focused user interface for the on-line support system.

FIG. 5A is a diagram of one embodiment of a focused user interface for the on-line support system. The layout of the interface may dynamically focus or shift to allow the most important features in use to be prominently displayed. As used herein a focused window or application is a window or application in which the functionality of that window or application is prepared to interact with and receive user input. For example, when an index 531 is being accessed to navigate through or select content, then the index 531 may be expanded and displayed in a large auxiliary window 535 or panel on the left side of the screen. Other windows may be shifted to less prominent locations. For example, the content window 201 may be shifted to the right side of the screen. Other windows may be reduced in size, faded or similarly altered to reduce the focus on these screens and to enhance the prominence of the window. A user may also be able to specify a desired window layout by selecting a desired layout from a menu or by dragging and resizing windows. In a further embodiment, a user may be able to specify preferences for the automatic or dynamic adjustment of the windows arrangement, including number of simultaneous windows displayed, use of fading and similar settings.

Figure 5B:
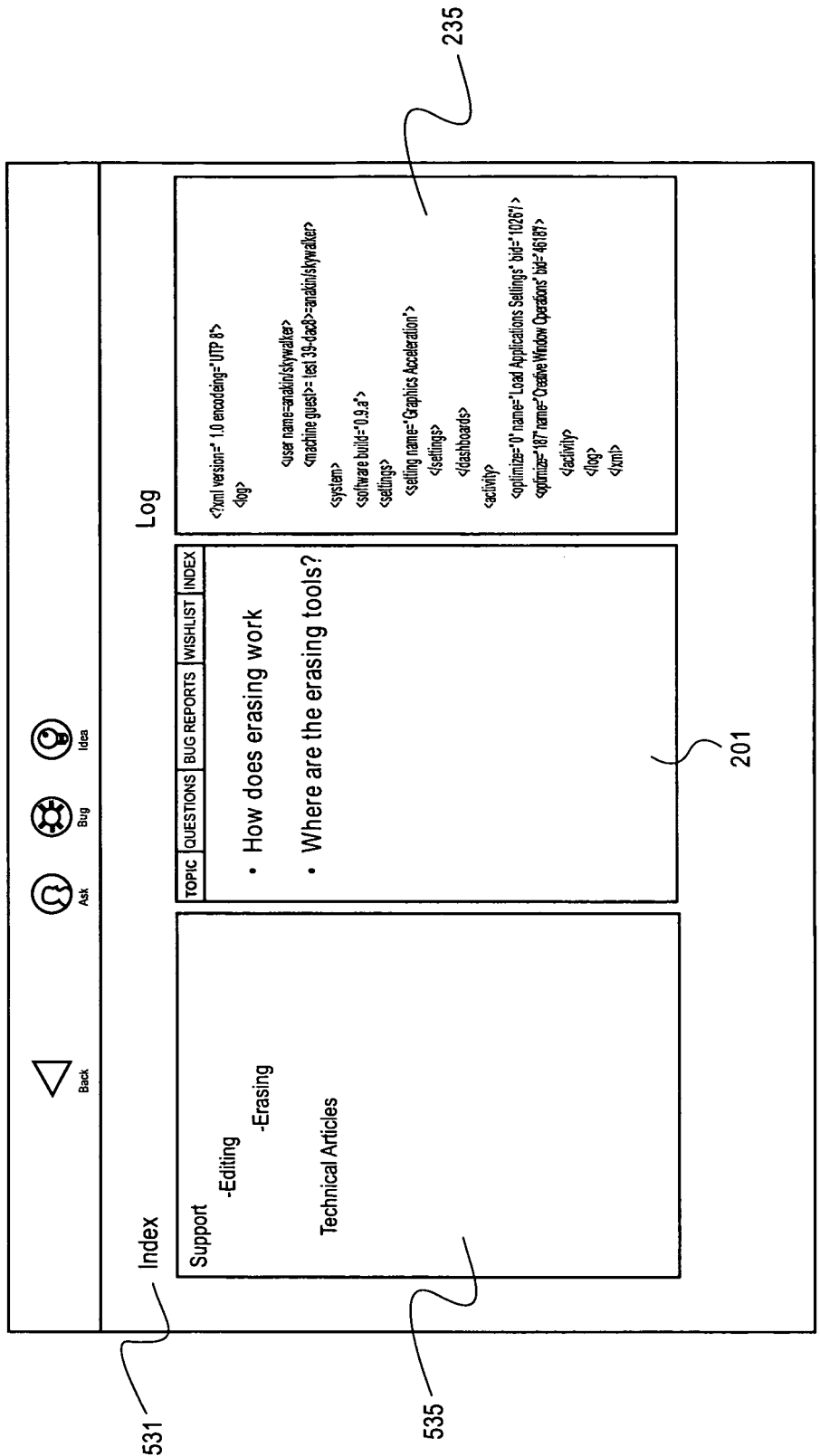
FIG. 5B is a diagram of one embodiment of a focused user interface for the on-line support system.

FIG. 5B is a diagram of one embodiment of a user interface for the on-line support system. The layout of the interface may dynamically focus, realign, shift, resize, or similarly adjust during use to bring windows into focus or prominence that are being used while diminishing the focus and emphasis on windows that are not in use. A further example embodiment displays three or more windows simultaneously. A primary window may be placed on the left side or at any portion of the screen favored by a user. Other windows or sections of the interface may be shifted left to right, shrunk, shuffled, faded or similarly adjusted. For example, while an index window 535 is being utilized a content window 201 may be centered to show the effects of the selections in the index window 535. A third viewing window 235 may be shifted to the far right, faded, or similarly adjusted to defocus it and its elements which are not in use. A user may bring a cursor over the third window 235 to bring it back in focus or similarly select the window to increase its focus. The window positions may shift automatically or at the instruction or input of the user.

Figure 5C:
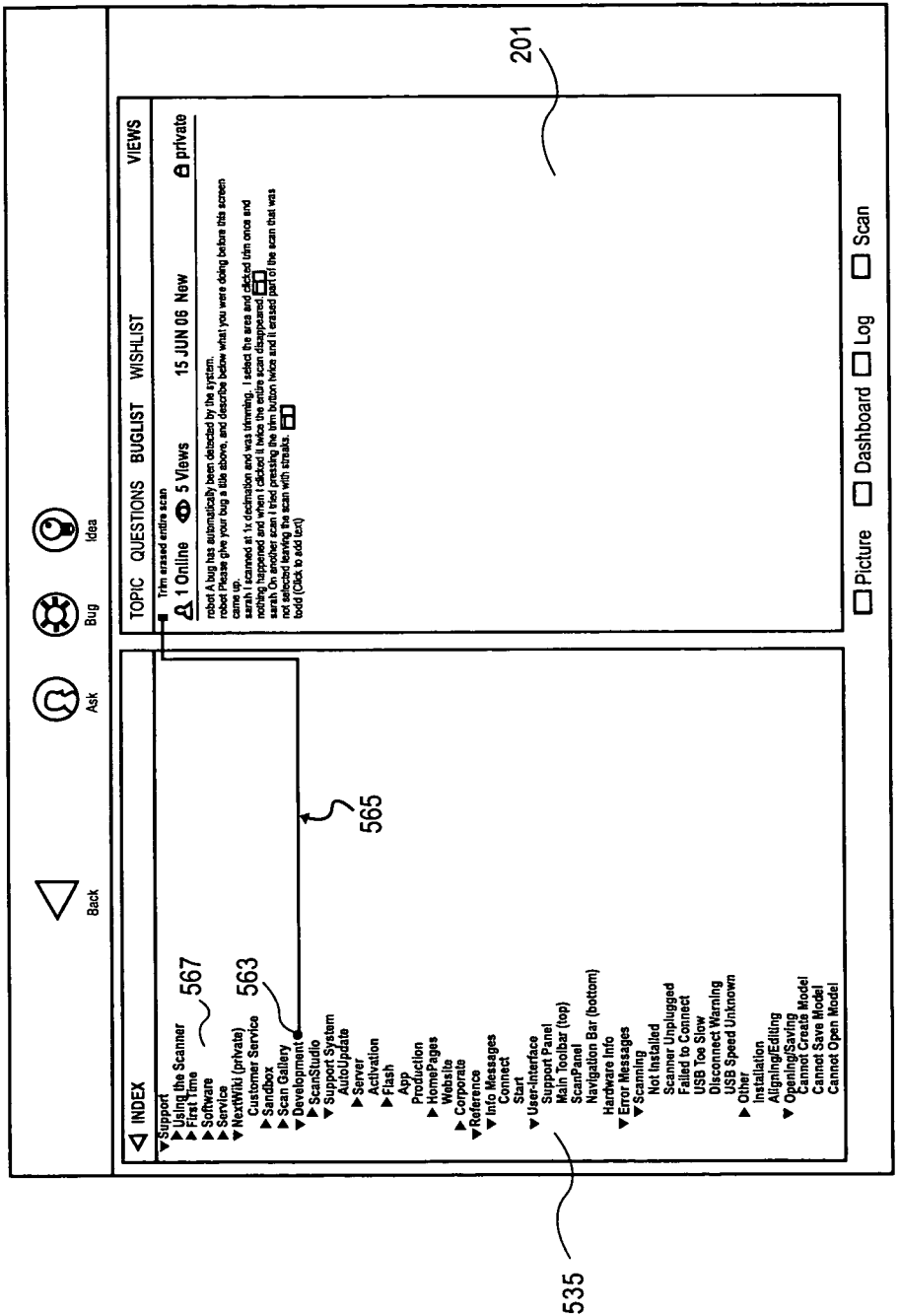
FIG. 5C is a diagram of one example embodiment of a user interface for associating an article with a location in the hierarchy.

FIG. 5C is a diagram of one example embodiment of a user interface for associating an article with a location in the hierarchy. In the example embodiment, the hierarchy may be displayed through an index of topics in the window 535. A full listing of locations in the hierarchy may be displayed or a subset of the locations may be displayed. The relative position of topics may also be indicated by indenting, coloration, icons or similar indicators.

The user interface may also present an article in the content window 201 at the same time that the index in window 535 is displayed. The title 561 of the article may be displayed. The article or article title 561 may be connected through a line 565, arrow or similar indicator with the associated topic or location in the hierarchy. The associated topic 563 may be at one endpoint of the line 565, while the other end of the line is at the article or title of the article. 561. The end point of the line 565 may be disassociated with a topic 563 or location in the hierarchy. This may be achieved using any input device to select the line 565 or the endpoint and dragging or similarly indicating the new topic or location in the hierarchy that the article in the content window 201 is desired to be associated with.

In one embodiment, multiple lines or similar indicators may be utilized and displayed to link an article to multiple topics. This use of moveable lines may be utilized in other contexts to link articles to one another or similarly display relationships between articles in the system as well as provide a mechanism for redefining the relationships between articles and between articles and the hierarchy.

The line 565 is a visual indicator of a relationship that demonstrates the relationship across different windows or sections of the interface. In further embodiments, a line 565 or similar indicator or a set of such indicators may be used to show relationships between articles, hierarchy locations, and similar items across any number of displayed windows. For example, the lines or similar indicators may be used to show a relationship between an icon in a chat an a displayed image, a log entry and a topic, an article and a dashboard display or similar relationships between items.

Figure 6A:
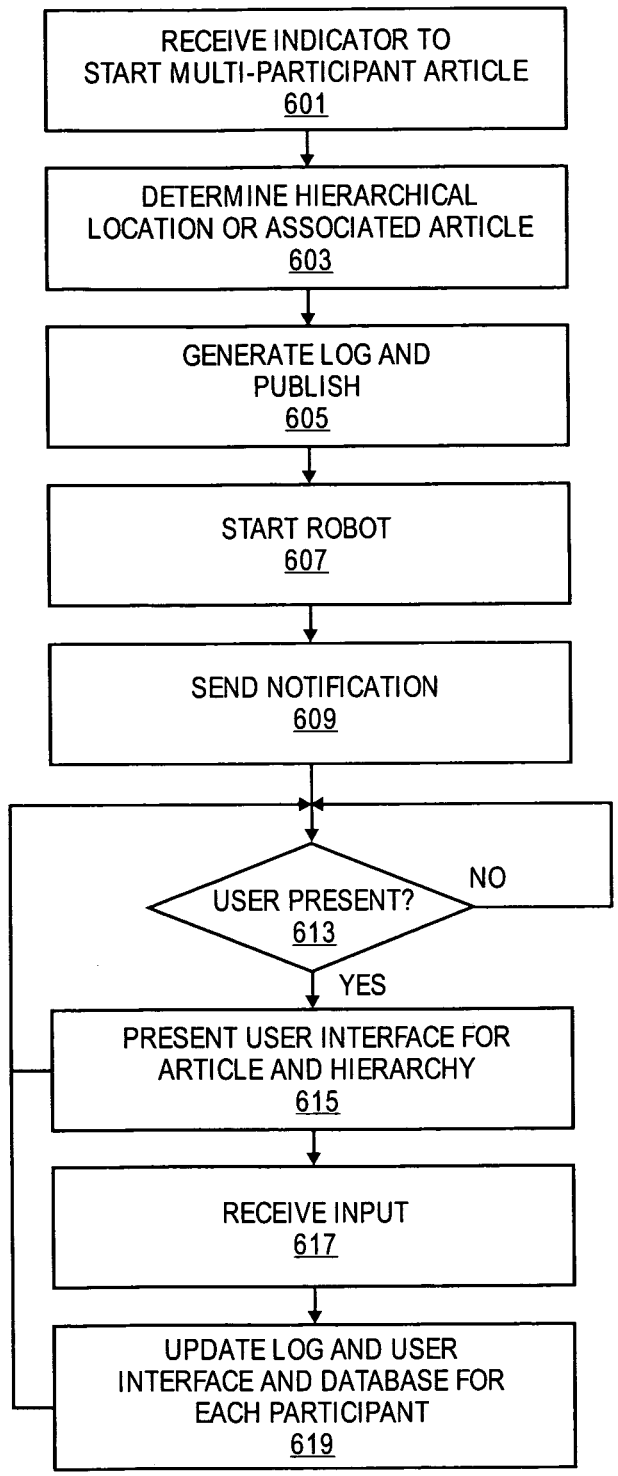
FIG. 6A is a flowchart of one embodiment of a process for creating and using a persistent chat.

FIG. 6A is a flowchart of one embodiment of a process for creating and using a persistent chat or similar types of multiple participant articles. In one embodiment, this process may be initiated by a user creating a new chat. The user may navigate to a desired space in the hierarchy of articles from an index menu or topics menu. The user may also navigate to a location within a hierarchy of Q&As, wish list items or bug listings. Alternatively, the user may initiate the chat without association with a specific location in the hierarchy. The user may initiate the chat or other article by selecting a 'create new' chat, topic, Q&A item, bug list item, wish list item or similar item provided through the user interface (block 601). The user may be prompted to input a title, keywords, hierarchy position or similar information prior to the creation of the new chat or other type of article. The user may directly designate the position of the new chat or other article in the hierarchy or may allow it to be inferred from context.

In response to receiving the initiation or create command the, on-line support system determines an appropriate location for the new chat or similar type of article in the hierarchy or determines an existing article to associate the chat or similar article with (block 603). This location may be determined based on the current navigated location of the user or a currently selected article. In another embodiment, the location may be determined by an analysis of the user input, such as a heading, or initial text input by the user. This determination may be later revisited by the on-line support system after additional text or input is received for the chat or similar article. A moderator or user with a predetermined permission level may also move the chat or similar article to a new location after review.

The on-line support system generates a chat log file or set of files to be associated with a new chat or similar multi-participant article (block 605). This file may store all data associated with the multi-participant article including the text input by participants, environmental variables, association with other chats or articles or similar data. This data may be stored in a server database allowing a user to access the chat at any time. A chat may be designated as public or private or have other characteristics or restrictions selected by a user, for example the creator. A server may also publish the new chat or similar article, by making it accessible to other users by navigation of the hierarchy.

In one embodiment, a robot or set of robots may be initiated or created and associated with a chat or multi-participant article (block 607). In another embodiment, robots may not be specific to a chat or multi-participant article, but may operate across chats, a set of chats or other types of articles. A robot as referred to herein may be a program that provides automated data in a chat session or other type of article session that may interact with a user in a chat session. For example, if a user creates a Q&A chat a robot may enter the chat session and post an expected time for support personnel to respond to the question. Similarly, the robot may interact with a user to collect data from the user that may be needed by the support personnel. The robot may be tied to an expert system or similar artificial intelligence that may attempt to answer the user's questions.

In one embodiment, the on-line support system may also generate a notification of a creation of a new chat session or other multi-participant article or the update of an existing chat or article (block 609). The notification may be sent to support personnel to allow them to monitor or engage a user in a new chat. The notification may be sent to other users who may have an interest in the chat, such as the author of another article attached to the chat. Previous chat participants for an existing chat may also be provided a notification. The notification may be the generation of a message such as an instant message or an email that is internal to the on-line system or that may go to an address external to the system. The notification may be a visual indicator, flag or similar indicator within the on-line system indicating that a chat is new, active or similar characteristics of the chat. The user interface may allow a search for new chats, or may provide a special window for accessing new or active chat sessions.

The server may check to determine if a chat session or other multi-participant article is being accessed by a user (block 613). A user may be automatically inserted into a chat session upon creation if the user is the creator. Any user may access the chat through the hierarchy, dependent on the permissions set on the chat. The server may provide access to any user at any time. The server provides access by providing the chat log and similar data upon access and by updating the data provided at any change generated by any user (block 615). Any associated hierarchy and article data may be continuously provided and updated by the server. This allows the user to interact with other users through the chat session in real time as each sees the same information through the user's own computer and software providing access to the on-line system.

In one embodiment, a user may provide input in the form of text, images, scans, dashboards, voice, logs and similar data to the chat (block 617). In one embodiment, the interface is a 'what you see is what you get' (WYSIWYG) interface. This information may be added to the chat session in real time as text, graphics, icons or similar representation. For example, images may be embedded and shown in the chat as icons. A user may view the images by selecting the icon causing them to display in a secondary window. Each change made by users may be added to the chat log and ancillary files, displayed through the user interfaces of users currently in the chat session and stored into a database at the server (block 619). The storage of data may include the storage of text data, image data or other media, embedded links and icons, article associations, hierarchy data and similar data.

The process of presenting the user interface for the chat session continues until the chat session is closed when all of the users have exited. The chat persists in the form of the chat log and maybe reconstituted as a continuing chat session at any time by a user accessing the chat session (block 615). This process described in the context of a chat is equally applicable to any multi-participant article. Users who previously participated in the chat may be notified by email, popup, new items list, chime, or other notification mechanism when the chat is updated.

Figure 6B:
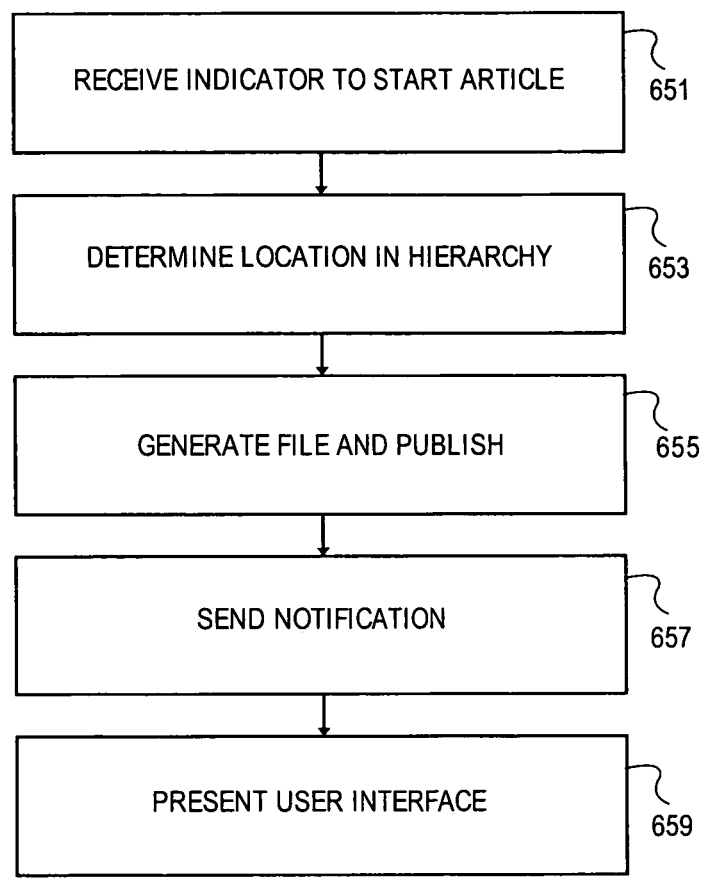
FIG. 6B is a flowchart of one embodiment of a process for creating and using an article.

FIG. 6B is a flowchart of one embodiment of a process for creating and using an article, such as a knowledge article or other primarily single participant article. This process is similar to the process of creating a chat or multi-participant article. In one embodiment, this process may be initiated by a user creating a new article. The user may navigate to a desired space in the hierarchy of articles from an index menu or topics menu. The user may also navigate to a location within a hierarchy of Q&As, wish list items, bug listings, meetings or similar categories. Alternatively, the user may initiate the article without association with a specific location in the hierarchy. The user may initiate the article by selecting a 'create new' article topic, Q&A, bug list item, wish list item, meeting or similar item provided through the user interface (block 651) An existing article, such as a knowledge article, may be similarly accessed by selecting an 'edit' button. The user may be prompted to input a title, keywords, hierarchy position or similar information prior to the creation of the new article. The user may designate the position in the hierarchy of the new article directly or allow it to be inferred from context.

In response to receiving the initiation or create command the on-line support system determines an appropriate location for the new article in the hierarchy or determines an existing article to associate the new article with (block 653). This location may be determined based on the current navigated location of the user or a currently selected article. In another embodiment, the location may be determined by an analysis of the user input, such as a heading, or initial text input by the user. This determination may be later revisited by the on-line support system after additional text or input is received for the article. A moderator or user with a predetermined permission level may also move the article to a new location after review.

The on-line support system generates a basic text file or set of files to be associated with the new article (block 655). This text file may store all data associated with the article including the text input by users, environmental variables, association with other articles or similar data. This data may be stored in a server database allowing a user to access the article at any time. An article may be designated as public or private or have other characteristics or restrictions selected by a user, for example the creator. A server may also publish the new article, by making it accessible to other users by navigation of the hierarchy or similar structure.

In one embodiment, the on-line support system may also generate a notification of a creation of a new article, or the update of an existing article (block 657). The notification may be sent to support personnel to allow them to monitor or review the new or modified article. The notification may be sent to other users who may have an interest in the article, such as the author of an article attached to or related to the new or modified article. The notification may be the generation of a message such as an instant message or an email that is internal to the on-line system or that may go to an address external to the system. The notification may be a visual indicator, flag or similar indicator within the on-line system indicating that an article is new, modified or similar characteristics of the article. The user interface may allow a search for new articles or may provide a special window for accessing new or modified articles.

Any user may access the article through the hierarchy, dependent on the permissions set on the article. The server may provide access to any user at any time (block 659). The server provides access by providing the article text file and similar data upon access and by updating the data provided at any change generated by any user. Any associated hierarchy and article data may be continuously provided and updated by the server.

In one embodiment, a user may provide input in the form of text, images, scans, dashboards, voice, logs and similar data to the article (block 617). This information may be added to the article as text, graphics, icons or a similar representation. For example, images may be embedded and shown in the article as icons. A user may view the images by selecting the icon causing them to display in a secondary window. When the user posts a images or other data to the article, the representation may appear at the current cursor position in the article text. For example, the user may post the current picture from their camera, and an icon representing the picture can appear at the current cursor position in the text. Each change made by users may be added to the article text file and ancillary files, displayed through the user interfaces of users currently accessing the article and stored to a database at the server. Changes made by a user editing the article may be displayed in a different color, such as yellow, or similarly highlighted for the user. Other users may not see the edits created by a user unless the editing user commits the changes. In one embodiment, edited versions of articles may be immediately displayed to the editing user, but only published for display to other users upon approval. Each version of an article may be stored by the on-line system. In one embodiment, approval criteria for an edit of an article may be enforced by other users or specially designated users. In another embodiment, the approval process may be automated based on a set of defined criteria. A rejected article may be removed from the on-line system or restricted to access by the editing user to allow for correction. The on-line system may restore articles to previous versions to allow for removing edits and similar purposes.

Figure 7:
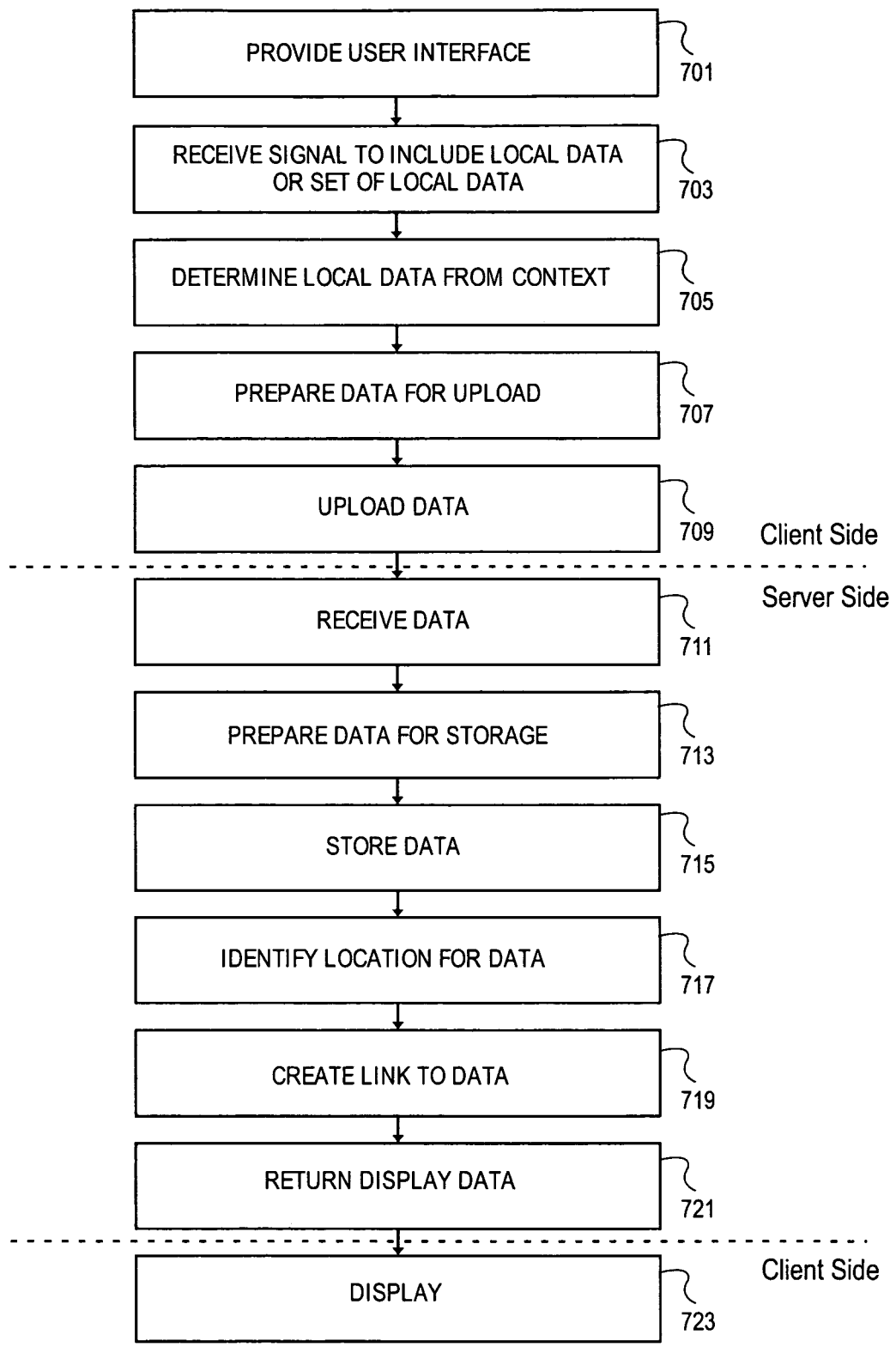
FIG. 7 is a flowchart of one embodiment of a process for adding content to an article or chat.

FIG. 7 is a flowchart of one embodiment of a process for adding content to an article. This process is described with reference to example embodiments of knowledge articles and chats and is equally applicable to other types of articles. A user may interact with the on-line support system through the user interface provided by the on-line support system as described herein above (block 701). For example, a user may start a chat, enter an existing chat or view or edit a knowledge article. While viewing or editing a knowledge article or participating in a chat a user may desire to include a file, image, dashboard, log or similar data in the chat, and may select to include such data. The data may be selected by clicking a corresponding button, checkbox or similar interface item (block 703).

In one embodiment, the local application will make a determination as to the desired data to be uploaded and linked based on the current context (block 705). For example, if a user selects to include an image, the most recently accessed image, most recent screenshot or similar image may be selected. If a user selects to upload a scan, the most recently captured scan may be uploaded. If a user selects to upload a two dimensional image from a camera, the most recently captured image may be uploaded. In another embodiment, the local application or other applications will capture the indicated data. For example, if an image is selected a screenshot may automatically be taken or if a scan is selected a scan may automatically be initiated or a camera picture may automatically be captured. The corresponding data may then be automatically uploaded. Alternatively, the data may be previewed locally with a confirmation required to initiate the upload.

In one embodiment, multiple items may be selected and uploaded together. The individual items may be identified automatically or by the user. They may be grouped together as a batch or compendium of data. This data may be linked separately or as a group in the associated knowledge article or chat. A batch may include N different items such as images, models or similar data. In one embodiment, N may be any value greater than one. Batches may be used to group multiple images that form a larger image or video clip. Alternatively, N images may be combined into an improved quality single image before or after transmission.

The data that is selected may be prepared prior to upload (block 707). As used herein to modify data for uploading, "prepared" is deemed to include any of capturing, synchronizing, converting, formatting, storing, etc. For example, the data may be compressed to minimize the size of the file and bandwidth requirements for the transfer of the file. The data may be formatted to standard image, scan or other data formats to ensure that the data can be easily viewed by other users. After the data has been prepared the data may be transferred to the server using any communications or file transfer protocol (block 709). The upload of the data may be concurrent with the upload of local text information. Uploaded data may include characteristics of the data, such as spatial coordinates representing a point of view of the image when the image was captured and similar data. This data may be used for organizational purposes during storage or subsequent display. For example, image data may be digitized based on spatial coordinates such that presentation of the images on the display approximate their relative real world relationship.

The uploaded data is then received by the server (block 711). The server may be remote or local to the user sending the file. The data may be transferred over a LAN or WAN such as the Internet. The server may support encryption and error correction to protect the data during transmission. The server or user may determine the characteristics of the communications link between the user computer and the server and select an appropriate protocol or method of file transfer.

In one embodiment, the server may prepare the data received prior to storage (block 713). This process may include compression of the data or formatting of the data. The data may also be reorganized to fit a schema or similar organization of a database in which it is to be stored. For example, the data may be reorganized to be stored in a relational database or an object oriented database. The data may be grouped together and archived or similarly compressed or organized dependent on the storage system utilized.

After the data has been prepared for storage the server may store the data (block 715). The data may be stored in any type of file management or data base management system. The file or database management system may be located on a single server or distributed across multiple servers. The storage system may be local to the server or remote from the server.

In one embodiment, the on-line system server may identify other articles, media and hierarchy locations, which the incoming data is to be associated with (block 717). These associations may be added to the database or file system entries of the stored data and to the entries of the associated articles, media and hierarchy. The hierarchy may be maintained as a set of interrelationships between articles and their dependent media files. In another embodiment, the interrelationships may be maintained as a separate data structure.

A link, icon or similar structure may be embedded into a specific article at the location of the user's action location, for example a cursor point (block 719). The link may be embedded as a hypertext markup language item, an extensible markup language (XML) indicator or similar tool for embedding links, pointers or similar markers for related content. This link may be returned to the creating user or any user accessing the article (block 721). The link to data may be displayed to a user as an icon, marker, image or similar indicator (block 723). This embedded link may be accessed to cause the related data to be retrieved from the server and displayed to the user. For example, a log may be linked to a chat entry or knowledge article through a small icon that indicates a log is available for viewing. A user may click on the icon and the log will be retrieved and displayed in a window adjacent to the chat or knowledge article. In one embodiment, the on-line system may also synchronize the viewing or use of shared data between users. For example, the on-line system may synchronize parameters of an image presented at the originating computer or source node and the destination computers.

In one embodiment, the user interface application creates a globally unique identifier for each data item it uploads, and sends this identifier to the server with the data. This allows the user interface application to associate the data with the article in advance of any response from the server.

Figure 8:
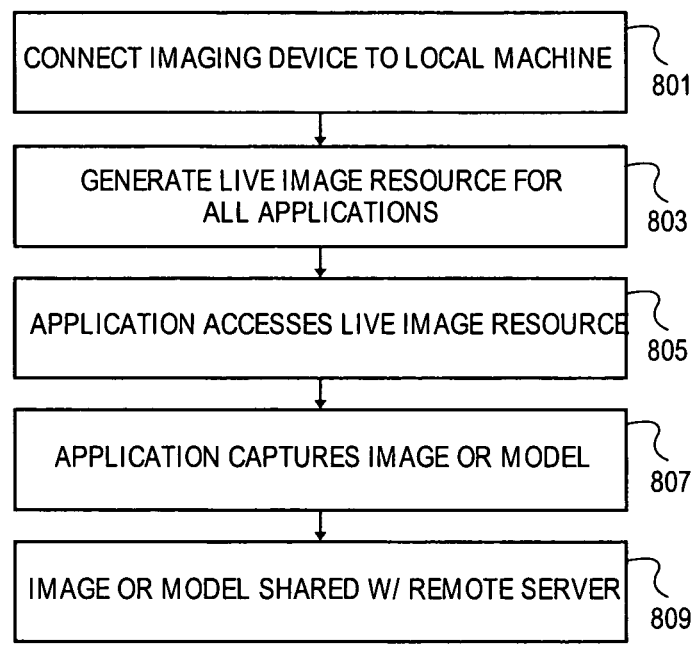
FIG. 8 is a flowchart of one embodiment of a process for collecting data to be imported into a chat or article.

FIG. 8 is a flowchart of one embodiment of a process for collecting data to be imported into an article. An external device may be a source of data for adding to an article. The device may be connected with a computer of the user or may be in communication with the computer of the user (block 801). For purposes of clarity, the example of an imaging device is described herein. However, other peripheral devices including video cameras, scanners, measuring devices and similar devices may also be utilized to collect data.

The imaging device may provide the local system with an image resource in the form of still images, a video stream, intermittently updated images or similar image resources (block 803). This resource may be available to all applications or only to an application associated with the on-line support system. The resource may be always available or only available on request or available under user defined circumstances.

In one embodiment, when the on-line support system receives a command to incorporate data from the imaging device the live resource may be accessed (block 805). In another embodiment, the resource may be periodically accessed or accessed upon user direction. The most recent access of the resource may be utilized by the on-line support system. The on-line support system or associated application may then capture or store the available imaging resource data (block 807). After capture a segment of the whole of the captured media may be selected for use, such as a frame from a video.

In a further embodiment, the user may preview the live resource through the on-line support system. The live resource may be viewed through an ancillary window or directly in the desired location in the content window allowing a user to preview the input from the imaging device. The user may then confirm the capture of an image from the live resource. The input from the live resource may be streaming, individual images that update or similar data. In another embodiment, the user may preview data through the imaging device. The imaging device may have a display device, viewfinder or similar preview mechanism. The imaging device may then be used to capture using the capture button or through a similar mechanism. No confirmation process may be necessary after capture of the data. In another embodiment, the confirmation of a capture may be required. The confirmation may be made within the user interface or the device providing the data. The selection of whether to include data may be made either before or after actual capture of the data. This data then may be prepared and uploaded to the on-line support system for sharing in relation to an article as described herein above (block 809).

In another embodiment, captured shared data may be automatically imported into other applications including word processing application, spreadsheet applications, email clients, voice communication clients, chat clients, online forums, presentation editors or similar applications. The automatic insertion system may be added to these applications as a plug-in or similar add on or may remain a separate application. In one embodiment, use of the automated insertion process does not require that the application currently in use or the application that is currently in focus, such as the on-line support system interface or another general purpose application such as a word processor, be deselected or defocused to capture and insert the desired shared data. The automated process may run without having to come to the foreground or into focus and disrupt usage of the current foreground application or currently focused application. As used herein, "focus" when modifying an application or window refers to the application window that is currently designated to receive user inputs. Thus, the shared data may be automatically inserted into a current focus application window at a designated action location. This process may be completed with or without the assistance of a dialogue box. However, it is desirable that if a dialog box exists, it not shift the focus from the text window to the dialog box. Thus, in this context, the dialog box may be, for example, informational, but does not require user input.

In one embodiment, the insertion may be performed by a background process that automatically detects a new image and loads the image into the clipboard by performing an implicit "cut" and then pastes it automatically into the document of the current focus application at the cursor by signaling a "paste" to that application. Since the entire cut and paste is performed in background, the user never needs to change the focus of the application.

The resolution or data characteristics of captured data may differ between preview and capture. Similarly, data characteristics may differ between capture and upload. For example, an image or similar data may be captured at a higher resolution or with a larger number of pixels than was displayed at preview. This allows for the system to send images that are based on the captured source, which may have a higher resolution than the local viewer. For example, a cellular phone may have the ability to capture a high resolution image, but has a low resolution display. The full image may be sent from the phone into the system and to the target destination even though its full resolution cannot be viewed without zooming or the full number of pixels cannot be viewed concurrently at the cellular phone.

Figure 9:
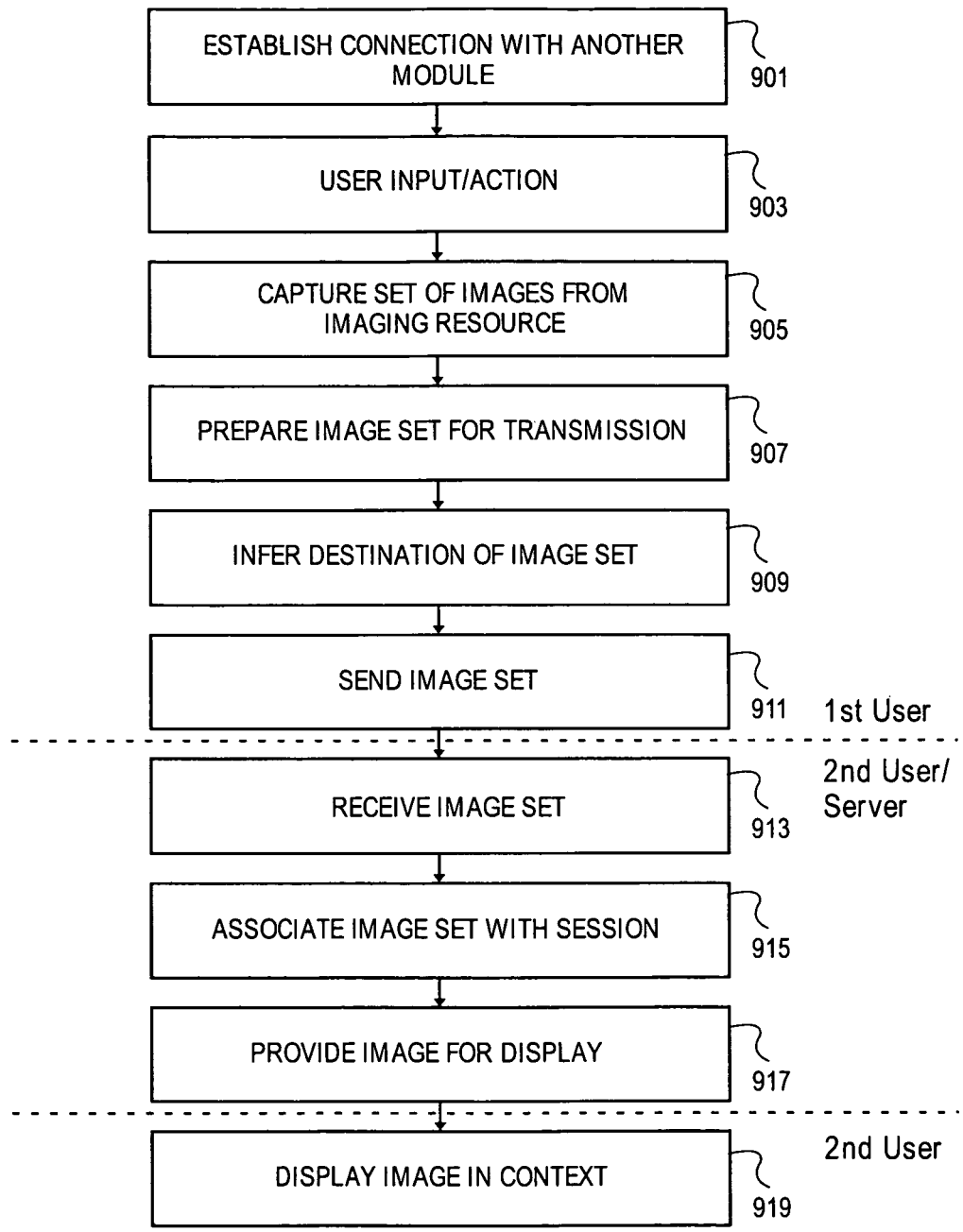
FIG. 9 is a flowchart of one embodiment of a process for providing a collaboration application with shared images.

FIG. 9 is a flowchart of one embodiment of a process for providing a chat with imaging. In one embodiment, a shared article such as a chat with images may be utilized between users as part of or separate from a general on-line support system to allow collaboration between users. The collaboration system may also support any of the article, hierarchy or other features described herein above.

Any number of users may participate in the collaboration. Each user may establish a connection with the other members of the collaboration or may connect with a server hosting the collaboration (block 901). The chat may be initiated and any user may provide input (block 903). The input may be text input or an indication of an image, set of images, video, logs or similar types of data to be shared. Other types of data may include scanned models, flash animations or similar data.

In response to the user action, a set of images or other data to be shared may be captured or retrieved from an image resource such as a camera, scanner or similar resource (block 905). In one embodiment, the captured data is at least one discrete image that is captured in response to a discrete user input. The user action or input may be a mouse click, keyboard event, a button press on the capture device or other user input on the capture device, a voice command, actuation on a remote control, a gesture, a touch pad event, a touchscreen event, a stylus input substantially any graphical input device event, motion capture event or similar input. These input types may also be utilized to designate a location for the insertion of data.

The appropriate source for data to be shared may be inferred from the context of the user request. For example, a user may select that an image is to be added to a collaboration and the application may select the most recent image captured from a resource to share. The captured image, set of images or similar data to be shared may then be prepared for transmission to other users (block 907). The shared data may be formatted for a common format accessible to all users. The shared data may be compressed to minimize bandwidth requirements for the collaboration.

The destination of the image data may be determined from the context of the collaboration application (block 909). Each user in a session or similar criteria may be use to determine a set of destinations for the shared data. Users that have previously been a part of a session or who subscribed to a particular session, chat or article may also be provided with the shared data. In another embodiment, the shared data is sent to a set of explicitly selected users. The shared data may also be sent to the server for storage. The shared data may include information relating to the session or article to which it is to be associated. The shared data may also include session participants, permissions data and similar data. The shared data may be transmitted to the other users through the server (block 911). Any transmission protocol or communications process may be used to transfer the data to the other users or to a server.

Each user participating in a session or a server hosting the session may receive the shared data (block 913). The server or users applications may associate the incoming data with a particular session or article dependent on the information contained within the shared data that may provide an explicit indication of the session (block 915). In another embodiment, the associated session or article may be inferred from the source, contents or other information available. The received shared data may be stored or cached local to the receiving user or server.

The received shared data may be prepared for display by decompression, format conversion or other similar data preparation actions (block 917). In an embodiment, where a server is involved the data preparation may involve preparing the data for transmission to the appropriate end users. The data may be reformatted, compressed or similarly prepared. Once the data has been received by the end users, then it may be displayed (block 919). The collaboration program may display the shared data or may utilize a plug-in or helper application to display the received data. In one embodiment, the communication session may be a voice call using, e.g., a cell phone or voice over internet protocol. From a platform with a local imager, such as are ubiquitous on existing cell phones, capture of an image to be stored can be sent directly and concurrently to the other participant in the communication session. The destination can be inferred based on the participants in the session.

Figure 10:
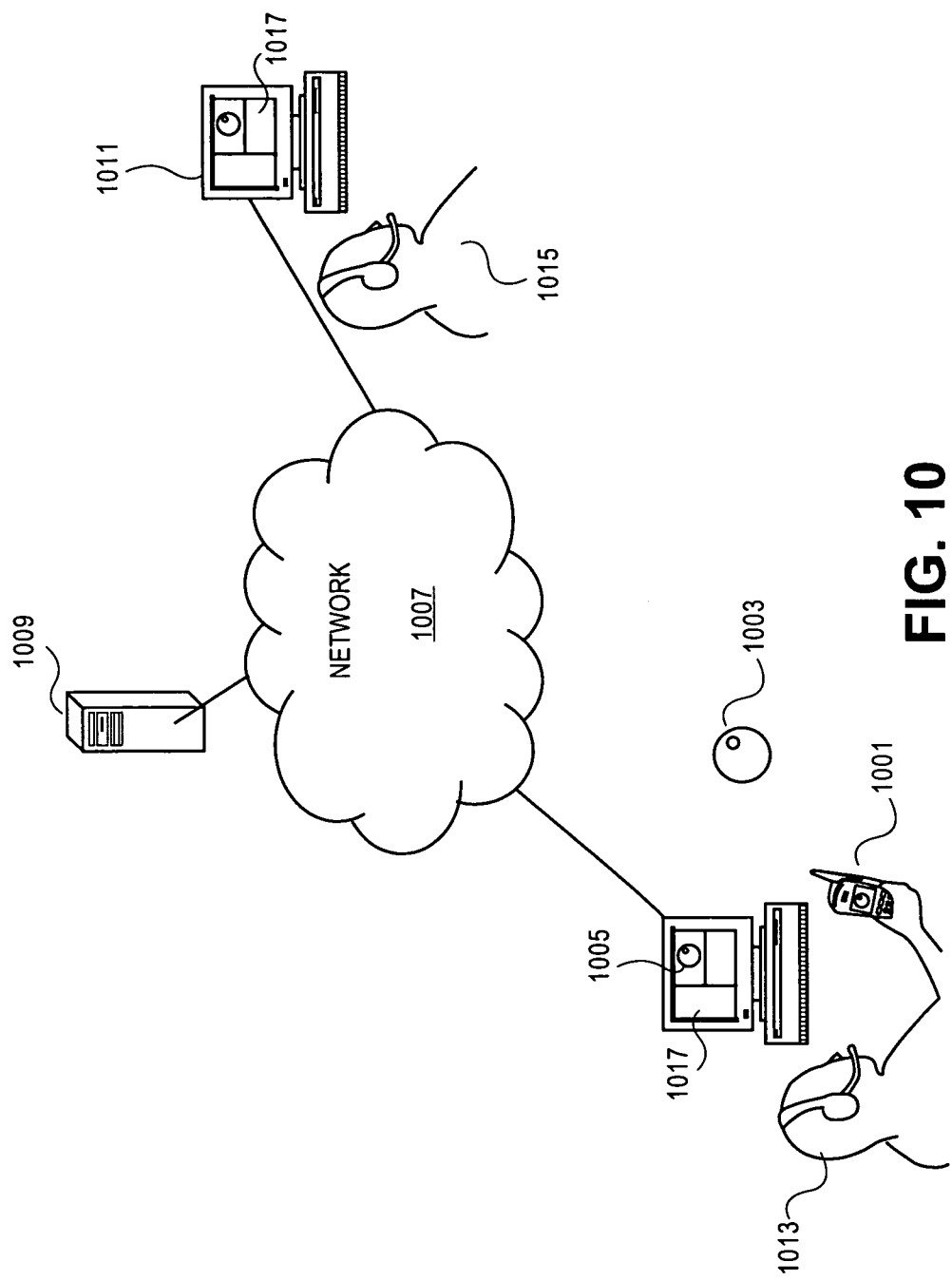
FIG. 10 is a diagram of one example embodiment of a collaboration system.

FIG. 10 is a diagram of one example embodiment of the collaboration system. The collaboration system may allow any number of users to communicate with one another by text, voice and images as described above. Communication may be over a distributed network 1007, such as a LAN, WAN, the Internet or similar distributed network. A server 1009 that is either local or remote may facilitate communication, file exchange and storage.

A first user 1013 may be in conversation with a second user 1015 at a remote location. The voice and text data that is shared through each user interface 1017 may be roughly identical for each user to minimize confusion in communication. In other embodiments, the user interfaces may be customized or otherwise differentiated as desired by the users 1013, 1015.

A user may input images or other media on the fly during the collaboration session. For example, a user 1013 may use an imaging device such as a cellular phone with a digital camera 1001 to capture an image of an object 1003 to share in the session. The digital camera 1001 or similar device may be in communication with the on-line support system through any communication means including wireless, direct link and similar mediums. The user may prompt the on-line system to include data into the collaboration session at an action location selected by the user or the data once detected as present by the collaboration system may automatically be added to the session at the current action location. The input of data in the session may be prompted by use of the data input device, such as a button on the camera phone, or through interaction with the on-line support system interface. The data may be automatically displayed on the local interface 1005 and then provided over the network to the other users to be viewed through their respective interfaces 1017.

In one embodiment, the image is sent to the destination node, e.g., 1011 with presentation parameter that may be synchronized with the host node 1017 to ensure both parties are viewing the same view, zoom level, center point, etc. The respective nodes may continue to synchronize their presentation parameters during the session to ensure continued consistent viewing by the session participants. In one embodiment, the image is posted to server 1009 with a set of presentation parameters from the host node 1017. The other nodes, e.g., 1011 may select to view the image at any time, and the presentation parameters will be automatically effected on their display, so that they are viewing the same view, zoom level, center point, etc. as the host node 1017 at the time of posting.

The selection of users to share the input data may be automatic or manual. The user initiating the input of data to share may explicitly select designated targets for the sharing of data through a user list or similar selection process or the on-line support system may determine the recipients based on the context in which the input data is supplied. For example, if the user providing the data is in an active collaboration session then all current participants may be supplied with the shared data.

In some embodiments, the session participants may be allowed to annotate the image. For example, portions of the image may be highlighted or cropped. In some embodiments, captions, symbols or free sketching may also be added to or performed on the image. Images may be composited or overlayed with other images or other data. All of these features fall within the broad category of annotation as used herein.

In some embodiments, the image will automatically zoom the image to a point and amplification inferred to be useful or desirable as an initial presentation view. A user may then be permitted to zoom differently or pan the image as desired. The inference of desired zoom level and point may be based in part on any of an analysis of the pixels captured and detail present in the image, a content context, such as where the image is to be displayed or user input.

Some of the processes herein are described with reference to flow diagrams. It should be recognized that some of the operations may occur in an order other than depicted. Moreover, some operation may occur in parallel. Such flow modification is explicitly within the contemplation of various embodiments of the invention.

As noted periodically above, embodiments of the invention are described within the context of an on-line support system. However, it should be recognized that various embodiments have significant applications outside this context. For example, delivery of image data to a destination determined by context is valuable in any situation where sharing of captured real world images facilitate communication between two parties. Among the possible contexts are nearly any conference call in which discussion of real worlds objects may occur, design meetings between remote parties, and collaborative session of nearly any kind. Even more generally the contextual distribution of images may be used in giving directions, e.g., "turn left at the building you just got the picture of." It should be apparent that the applications of certain embodiments goes far beyond merely use in a support system and these other applications are expressly intended to fall within the scope of the claims below.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Thus, if a feature is described with reference to one embodiment it may be used with another.

In one embodiment, the on-line support system may be implemented partially or entirely as hardware devices, such as application specific integrated circuits (ASICs). In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

We claim:

1. A system comprising:
 a subsystem of a computer to communicate over a distributed network, the subsystem to:
 organize a chat session in a hierarchy of subject matter wherein a session comprises a sequential series of communications from at least one participant;
 automatically receive and display to a participant new communications within the session;
 allow a participant to compose a new communication while receiving or viewing other communications; and
 at least one database to maintain a persistent record of the sessions and the hierarchical organization; and
 a user interface to allow the participant to view the hierarchy and specify a relationship of the session to the hierarchy.

2. The system of claim 1 further comprising:
 a data structure to maintain a relationship between subject matter articles and chat sessions within the hierarchy.

3. The system of claim 1 further comprising:
a monitor module to monitor connected devices and transmit information about the devices for association with the session.

4. The system of claim 1 further comprising:
a robot chat participant to engage in a chat sequence with another chat participant.

5. The system of claim 1 further comprising:
a notification agent to provide a notification of a session event external to the session.

6. The system of claim 1 wherein the system comprises:
a technical support system.

7. A method comprising:
organizing a chat session in a hierarchy of subject matter wherein a session comprises sequential series of communications from at least one participant;
automatically receiving and displaying to a participant new communications within the session;
permitting a participant to compose a new communication while receiving or viewing other communications;
accepting a user input to specify a relationship of the session within the hierarchy; and
maintaining a persistent record of the sessions within the hierarchy.

8. The method of claim 7 further comprising:
prompting the user to specify the relationship.

9. The method of claim 7 wherein a communication comprises:
at least one of text, voice content or an image.

10. The method of claim 7 wherein organizing comprises:
defining the session as relating to one of a question, a bug, an idea or a meeting.

11. The method of claim 7 further comprising:
exiting the session by all participants;
reentering the session by at least one participant; and
continuing the session.

12. A system comprising:
a subsystem of a computer to communicate over a distributed network, the subsystem to:
associate a chat session with a knowledge article in a knowledge repository wherein a session includes a sequential series of communications from at least one participant;
automatically receive and display to a participant new communications within the session;
allow the participant to compose a new communication while receiving or viewing other communications;
at least one database to maintain a persistent record of the sessions and the associations; and
a user interface to allow the participant to view articles and specify an association of the session to a knowledge article.

13. The system of claim 12 further comprising:
an editing tool to permit a user to edit a knowledge article.

14. A method comprising:
associating a chat session with a knowledge article in a knowledge repository wherein a session includes a sequential series of communications from at least one participant;
automatically receiving and displaying to a participant new communication within the session;
permitting the participant to compose a new communication while necessary or viewing other communications in the session;
accepting a user specification of an association between the session and a knowledge article; and
persisting a record of the session and the associations in a database.

15. The method of claim 14 further comprising:
permitting edits to a knowledge article by a first participant.

16. The method of claim 15 further comprising:
displaying an edited version of the knowledge article to the first participant prior to an approval process;
storing the edited version in the database; and
making the edited version available to other participants if approval criteria are satisfied.

17. The method of claim 14 further comprising:
exiting the session by all participants;
reentering the session by at least one participant; and
continuing the session.

* * * * *